(12) United States Patent
Xie et al.

(10) Patent No.: US 11,233,724 B2
(45) Date of Patent: Jan. 25, 2022

(54) MULTICAST DATA PACKET PROCESSING METHOD, AND APPARATUS

(71) Applicant: HUAWEI TECHNOLOGIES CO., LTD., Shenzhen (CN)

(72) Inventors: Jingrong Xie, Beijing (CN); Sheng Fang, Beijing (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 0 days.

(21) Appl. No.: 17/009,640

(22) Filed: Sep. 1, 2020

(65) Prior Publication Data

US 2020/0403903 A1    Dec. 24, 2020

Related U.S. Application Data

(63) Continuation of application No. PCT/CN2019/075317, filed on Feb. 18, 2019.

(30) Foreign Application Priority Data

Mar. 2, 2018   (CN) .......................... 201810175653.1

(51) Int. Cl.
 *G06F 15/16* (2006.01)
 *H04L 12/761* (2013.01)
 (Continued)

(52) U.S. Cl.
 CPC .......... *H04L 45/16* (2013.01); *H04L 12/1877* (2013.01); *H04L 45/24* (2013.01); *H04L 45/48* (2013.01); *H04L 45/507* (2013.01)

(58) Field of Classification Search
 CPC ............................ H04L 45/16; H04L 12/1877
 See application file for complete search history.

(56) References Cited

U.S. PATENT DOCUMENTS

| 7,564,806 B1 * | 7/2009 | Aggarwal ............... H04L 12/18 370/256 |
| 10,164,794 B2 * | 12/2018 | Wijnands ............ H04L 12/4625 |

(Continued)

FOREIGN PATENT DOCUMENTS

| CN | 105556899 A | 5/2016 |
| CN | 106209559 A | 12/2016 |

(Continued)

OTHER PUBLICATIONS

Hao Y Li s Zhuang Huawei W:"BIER Split-horizon mechanism for active-active access; draft-hao-bier-active-active-00.txt",Jan. 11, 2016,total 8 pages.

(Continued)

*Primary Examiner* — Hieu T Hoang
(74) *Attorney, Agent, or Firm* — Hauptman Ham, LLP

(57) ABSTRACT

A multicast data packet processing method in a point-to-multipoint (P2MP)-based bit index explicit replication (BIER) multicast tree, which includes an intermediate node configured to use P2MP to forward a BIER packet, includes receiving a first multicast data packet with a BIER header having a first label. The method further includes obtaining a first forwarding entry based on the first label. The first forwarding entry includes the first label, a first identifier identifying the multicast tree, and a second identifier instructing to perform P2MP forwarding. The method further includes obtaining, based on the first identifier, a second forwarding entry including the first identifier and a second label. The method further includes obtaining a second multicast data packet based on the second identifier, the second forwarding entry, and the first multicast data packet, and sending the second multicast data packet. The second multicast data packet includes the second label.

16 Claims, 11 Drawing Sheets

(51) Int. Cl.
    *H04L 12/707*     (2013.01)
    *H04L 12/753*     (2013.01)
    *H04L 12/723*     (2013.01)
    *H04L 12/18*     (2006.01)

(56) References Cited

U.S. PATENT DOCUMENTS

| | | |
|---|---|---|
| 2015/0078377 A1 | 3/2015 | Wijnands et al. |
| 2015/0085635 A1* | 3/2015 | Wijnands ............ H04L 45/16 370/216 |
| 2015/0138961 A1* | 5/2015 | Wijnands ............ H04L 45/22 370/228 |
| 2015/0207640 A1 | 7/2015 | Teng |
| 2016/0119159 A1 | 4/2016 | Zhao et al. |
| 2018/0205636 A1* | 7/2018 | Hu ..................... H04L 45/16 |
| 2018/0212872 A1 | 7/2018 | Zhuang et al. |
| 2018/0287935 A1* | 10/2018 | Wang ................ H04L 12/4633 |
| 2018/0316520 A1* | 11/2018 | Wijnands ............ H04L 45/745 |
| 2019/0058606 A1 | 2/2019 | Wijnands et al. |
| 2019/0123922 A1* | 4/2019 | Suthar ................ H04L 12/1877 |
| 2020/0267011 A1* | 8/2020 | Peng .................. H04L 45/04 |

FOREIGN PATENT DOCUMENTS

| | | |
|---|---|---|
| CN | 106341327 A | 1/2017 |
| CN | 106549871 A | 3/2017 |
| CN | 106982157 A | 7/2017 |
| CN | 103716169 B | 11/2017 |

OTHER PUBLICATIONS

J. Xie, "Multicast VPN Using MPLS P2MP and BIER draft-xie-bier-mvpn-mpls-p2mp-00", Network Working Group Internet-Draft, Oct. 27, 2017, total 13 pages.

Przygienda Ericsson A BIER support via ISIS;draft-przygienda-bier-isis-ranges-00.txt,Sep. 27, 2014,total 8 pages.

S. Yasukawa, "Signaling Requirements for Point-to-Multipoint Traffic-Engineered MPLS Label Switched Paths (LSPs)", Network Working Group, RFC 4461, Apr. 2006, total 30 pages.

J. Xie,:"Multicast VPN Using MPLS P2MP and BIER; draft-xie-bier-mvpn-mpls—p2mp-00",Mar. 5, 2018,total 24 pages.

IJ. Wijnands et al,"Multicast Using Bit Index Explicit Replication (BIER)",Internet Engineering Task Force (IETF), RFC8279, Nov. 2017, total 43 pages.

IJ. Wijnands et al,"Encapsulation for Bit Index Explicit Replication (BIER) in MPLS and Non-MPLS Networks",Internet Engineering Task Force (IETF), RFC 8296, Jan. 2018, total 24 pages.

International Search Report issued in corresponding International Application No. PCT/CN2019/075317, dated May 17, 2019, pp. 1-9, National Intellectual Property Administration, Beijing, China.

Chinese Office Action issued in corresponding Chinese Application No. 201810175653.1, dated Feb. 6, 2020, pp. 1-7, State Intellectual Property Office of People's Republic of China, Beijing, China.

Extended European Search Report issued in corresponding European Application No. 19760490.3, dated Mar. 16, 2021, pp. 1-5, European Patent Office, Munich, Germany.

\* cited by examiner

MULTICAST DATA PACKET PROCESSING METHOD, AND APPARATUS

CROSS-REFERENCE TO RELATED APPLICATIONS

This application is a continuation of International Application No. PCT/CN2019/075317, filed on Feb. 18, 2019, which claims priority to Chinese Patent Application No. 201810175653.1, filed on Mar. 2, 2018. The disclosures of the aforementioned applications are hereby incorporated by reference in their entireties.

TECHNICAL FIELD

Embodiments of this application relate to the field of communications technologies, and in particular, to a multicast data packet processing method, and an apparatus.

BACKGROUND

In a multicast technology, a specific multicast address is used to transmit a multicast data packet to a host set corresponding to a multicast group according to a maximum delivery principle. A basic method of the multicast technology is as follows: A source host sends only one multicast data packet, and a destination address of the multicast data packet is a multicast group address. Each receiver in the multicast group may receive one multicast data packet. The multicast technology implements point-to-multipoint (P2MP) data transmission in an internet protocol (IP) network, effectively reducing network bandwidth and network load.

A P2MP-based BIER technology is one of BIER technologies. In a multicast network to which the P2MP-based BIER technology is applied, a multicast tree includes a P2MP tree in which a specified edge node is used as a root and another edge node is used as a leaf. The specific edge node is an edge node that is close to a multicast source and that can communicate with the multicast source. The another edge node is an edge node in the multicast network other than the specific edge node. A bit position may be allocated to each edge node used as a leaf, and the bit position may be used to uniquely identify the edge node of the multicast tree that is used as a leaf. Each edge node used as a leaf sends the bit position of the edge node to the root node of the multicast tree by using a tree building protocol, for example, a protocol independent multicast (PIM) protocol, multipoint extensions for a label distribution protocol (mLDP), or resource reservation protocol-traffic engineering (RSVP-TE). Each node of the multicast tree may learn of an edge node that is used as a leaf and that corresponds to each bit position. The root node may encapsulate a bit string into a multicast data packet to be sent to an edge node used as a leaf. A bit position in the bit string indicates a destination edge node at which the multicast data packet is to arrive. After receiving the multicast data packet including the bit string, a node of the multicast tree forwards the multicast data packet based on the bit string included in the multicast data packet, so that the multicast data packet is sent to the edge node that is used as a leaf and that is identified by the bit string.

To deploy the BIER technology in the multicast network, a device in the multicast network needs to be capable of identifying and processing a bit string in a BIER header. Currently, the device in the network needs to be upgraded to support the BIER technology. Consequently, the BIER technology has relatively high deployment costs and relatively great deployment difficulty.

SUMMARY

Embodiments of this application provide a multicast data packet processing method, and an apparatus, to resolve a prior-art problem that a BIER technology has relatively high deployment costs and relatively great deployment difficulty in a multicast network.

To achieve the foregoing objective, the following technical solutions are used in the embodiments of this application.

According to a first aspect, a multicast data packet processing method is provided, applied to a P2MP-based BIER multicast tree, where an intermediate node of the multicast tree supports to use P2MP to forward a BIER packet, and the method includes: receiving, by the intermediate node, a first multicast data packet, where a BIER header of the first multicast data packet includes a first label; obtaining, by the intermediate node, a first forwarding entry based on the first label, where the first forwarding entry includes the first label, a first identifier, and a second identifier, the first identifier is used to identify the multicast tree, and the second identifier is used to instruct to perform P2MP forwarding on the packet; obtaining, by the intermediate node, a second forwarding entry based on the first identifier, where the second forwarding entry includes the first identifier and a second label; and obtaining, by the intermediate node, a second multicast data packet based on the second identifier, the second forwarding entry, and the first multicast data packet, and sending the second multicast data packet, where the second multicast data packet includes the second label. That the intermediate node supports to use P2MP to forward the BIER packet may be understood as that the intermediate node does not support to process data in the BIER header other than a BIER label, and the intermediate node uses P2MP to forward the BIER packet. Herein, processing performed on a bit string includes: reading the bit string, an operation (an AND operation), and a subsequent forwarding action. The forwarding action is determining, based on an AND result, whether to perform a forwarding operation for a next hop. In addition, the intermediate node may further play a role of a multicast leaf. To be specific, the intermediate node may send a multicast data packet to a next-level node of the intermediate node, and may further send a multicast IP packet to a locally connected device.

In the foregoing technical solution, when the intermediate node cannot identify and process a bit string in the BIER header, but supports to use P2MP to forward the BIER packet, when receiving the BIER packet, the intermediate node may read only the BIER label, does not need to read or analyze data in the BIER header other than the BIER label, and uses P2MP to forward the BIER packet, so that the BIER technology can be deployed without upgrading hardware of a node, and deployment costs and deployment difficulty of the BIER technology are reduced.

In a possible implementation of the first aspect, the second forwarding entry further includes an outbound interface, and the obtaining, by the intermediate node, a second multicast data packet based on the second identifier, the second forwarding entry, and the first multicast data packet, and sending the second multicast data packet includes: replacing, by the intermediate node based on the second identifier, the first label included in the first multicast data packet with the second label, to obtain the second multicast data packet; and sending, by the intermediate node, the second multicast data packet through the outbound interface. Optionally, the outbound interface is determined by the intermediate node based on an identifier of a downstream node of the intermediate node, and is not necessarily determined based on an interface for receiving information from the downstream node of the intermediate node. In the foregoing possible implementation, when performing forwarding processing on the first multicast data packet, the intermediate node may replace the first label included in the first multicast data packet only with the second label, to obtain the second multicast data packet, and send the second multicast data packet through the outbound interface, thereby simplifying a BIER packet processing manner, so that the intermediate node can use P2MP to forward the BIER packet, and the deployment costs and difficulty of the BIER technology are further reduced.

In a possible implementation of the first aspect, before the obtaining, by the intermediate node, a first forwarding entry based on the first label, the method further includes: generating, by the intermediate node, the first forwarding entry based on first configuration information, the first label, and the first identifier, where the first configuration information is used to indicate that the intermediate node uses P2MP to forward the BIER packet, and the second identifier is an identifier obtained based on the first configuration information. Optionally, the intermediate node may generate the second identifier based on the first configuration information, or search a correspondence table based on the first configuration information, to obtain the second identifier. In the foregoing possible implementation, the intermediate node may obtain the second identifier based on a corresponding configuration, and generate the first forwarding entry, so that when forwarding the BIER packet, the intermediate node can use P2MP to forward the BIER packet.

In a possible implementation of the first aspect, the second forwarding entry further includes a third identifier and an outbound interface, the third identifier is used to instruct to delete data in the BIER header other than a BIER label, and the obtaining, by the intermediate node, a second multicast data packet based on the second identifier, the second forwarding entry, and the first multicast data packet, and sending the second multicast data packet includes: replacing, by the intermediate node based on the second identifier, the first label included in the first multicast data packet with the second label, to obtain a label-replaced first multicast data packet; deleting, by the intermediate node based on the third identifier, data in a BIER header of the label-replaced first multicast data packet other than the second label, to obtain the second multicast data packet; and sending, by the intermediate node, the second multicast data packet through the outbound interface. Optionally, the outbound interface is determined by the intermediate node based on an identifier of a downstream node of the intermediate node, and is not necessarily determined based on an interface for receiving information from the downstream node of the intermediate node. In the foregoing possible implementation, when the downstream node of the intermediate node does not support to delete the BIER label from the BIER header, the intermediate node may further delete the data in the BIER header other than the BIER label, and forward the BIER packet, so that deployment costs and difficulty of the BIER technology can be further reduced.

In a possible implementation of the first aspect, before the obtaining, by the intermediate node, a second forwarding entry based on the first identifier, the method further includes: receiving, by the intermediate node, the second label and second configuration information that are sent by a downstream node in the multicast tree, where the second configuration information is used to indicate that the downstream node does not support to delete the data in the BIER header other than the BIER label; and generating, by the intermediate node, the second forwarding entry based on the second label and the second configuration information, where the third identifier is an identifier obtained based on the second configuration information. The downstream node in the multicast tree may be a next-hop node of the intermediate node on a packet transmission path including the intermediate node and a specific leaf node. In the foregoing possible implementation, the intermediate node may obtain the second identifier based on a corresponding configuration, and generate the second forwarding entry, so that when forwarding the BIER packet, the intermediate node can delete the data in the BIER header other than the BIER label.

According to a first aspect, a multicast data packet processing method is provided, applied to a P2MP-based BIER multicast tree, where an intermediate node of the multicast tree supports to delete data in a BIER header other than a BIER label, and the method includes: receiving, by the intermediate node, a first multicast data packet, where a BIER header of the first multicast data packet includes a first label; obtaining, by the intermediate node, a first forwarding entry based on the first label, where the first forwarding entry includes the first label and a first identifier, and the first identifier is used to identify the multicast tree; obtaining, by the intermediate node, a second forwarding entry based on the first identifier, where the second forwarding entry includes the first identifier, a second identifier, and a second label, and the second identifier is used to instruct to delete the data in the BIER header other than the BIER label; and obtaining, by the intermediate node, a second multicast data packet based on the second forwarding entry and the first multicast data packet, and sending the second multicast data packet, where the second multicast data packet includes the second label.

In the foregoing technical solution, when a downstream node of the intermediate node does not support to delete the data in the BIER header other than the BIER label, when forwarding a multicast data packet, the intermediate node may delete data in a BIER header of the multicast data packet other than a BIER label, so that the downstream node of the intermediate node can implement processing or forwarding on the received multicast data packet. In this way, a BIER packet can be forwarded without upgrading hardware of a node, and deployment costs and difficulty of a BIER technology are further reduced.

In a possible implementation of the second aspect, the second forwarding entry further includes an outbound interface, and the obtaining, by the intermediate node, a second multicast data packet based on the second forwarding entry and the first multicast data packet, and sending the second multicast data packet includes: deleting, by the intermediate node based on the second identifier, data in the BIER header of the first multicast data packet other than the first label, to obtain a data-deleted first multicast data packet; replacing, by the intermediate node, the first label included in the data-deleted first multicast data packet with the second label, to obtain the second multicast data packet; and sending, by the intermediate node, the second multicast data packet through the outbound interface. Optionally, the outbound interface is determined by the intermediate node based on an identifier of a downstream node of the intermediate node, and is not necessarily determined based on an interface for receiving information from the downstream node of the intermediate node. In the foregoing possible implementation, when performing forwarding processing on the first multicast data packet, the intermediate node may replace the first label included in the first multicast data packet only with the second label, to obtain the second multicast data packet, and send the second multicast data packet through the outbound interface, thereby simplifying a BIER packet processing manner, so that the intermediate node can use P2MP to forward a packet that carries a BIER label, and deployment costs and difficulty of a BIER technology are further reduced.

In a possible implementation of the second aspect, before the obtaining, by the intermediate node, a second forwarding entry based on the first identifier, the method further includes: receiving, by the intermediate node, the second label and configuration information that are sent by a downstream node in the multicast tree, where the configuration information is used to indicate that the downstream node does not support to delete the data in the BIER header other than the BIER label; and generating, by the intermediate node, the second forwarding entry based on the second label and the configuration information, where the second identifier is an identifier obtained based on the configuration information. The downstream node in the multicast tree may be a next-hop node of the intermediate node on a packet transmission path including the intermediate node and a specific leaf node. In the foregoing possible implementation, the intermediate node may obtain the second identifier based on a corresponding configuration, and generate the second forwarding entry, so that when forwarding the BIER packet, the intermediate node can delete the data in the BIER header other than the BIER label.

According to a third aspect, a multicast data packet processing method is provided, and applied to a P2MP-based BIER multicast tree, where the multicast tree includes a leaf node, the leaf node does not support to process a bit string in a BIER header, and the method includes: receiving a second multicast data packet, where a BIER header of the second multicast data packet includes only a second BIER label; obtaining a third forwarding entry based on a multicast tree identifier, where the third forwarding entry includes a fourth identifier, and the fourth identifier is used to instruct to delete the BIER label; deleting the second BIER label from the second multicast data packet based on the fourth identifier, to obtain a multicast IP packet; and sending the multicast IP packet to a local outbound interface.

In a possible implementation of the third aspect, the method further includes: generating the third forwarding entry based on preconfigured label deletion instruction information and a first identifier, where the fourth identifier is an identifier obtained based on configuration information, and the label deletion instruction information is used to instruct the leaf node to delete the BIER label when the leaf node locally forwards a multicast data packet.

According to a fourth aspect, a forwarding device is provided. The forwarding device is an intermediate node applied to a P2MP-based BIER multicast tree, the forwarding device supports to use PIMP to forward a BIER packet, and the forwarding device may implement a function of the multicast data packet processing method provided in any one of the first aspect to the possible implementations of the first aspect. The function may be implemented by hardware, or may be implemented by hardware executing corresponding software. The hardware or the software includes one or more units corresponding to the foregoing function. For example, the forwarding device may include a receiving unit, an obtaining unit, and a sending unit. The forwarding device may further include a generation unit.

In a possible implementation of the fourth aspect, a structure of the forwarding device includes a processor, a memory, a communications interface, and a bus, and the processor, the memory, and the communications interface are connected by using the bus. The memory is configured to store program code, and when the program code is executed by the processor, the forwarding device is enabled to perform steps in the multicast data packet processing method provided in any one of the first aspect to the possible implementations of the first aspect.

According to a fifth aspect, a forwarding device is provided. The forwarding device is an intermediate node applied to a P2MP-based BIER multicast tree, the forwarding device supports to delete data in a BIER header other than a BIER label, and the forwarding device may implement a function of the multicast data packet processing method provided in any one of the second aspect to the possible implementations of the second aspect. The function may be implemented by hardware, or may be implemented by hardware executing corresponding software. The hardware or the software includes one or more units corresponding to the foregoing function. For example, the forwarding device may include a receiving unit, an obtaining unit, and a sending unit. The forwarding device may further include a generation unit.

In a possible implementation of the fifth aspect, a structure of the forwarding device includes a processor, a memory, a communications interface, and a bus, and the processor, the memory, and the communications interface are connected by using the bus. The memory is configured to store program code, and when the program code is executed by the processor, the forwarding device is enabled to perform steps in the multicast data packet processing method provided in any one of the second aspect to the possible implementations of the second aspect.

According to a sixth aspect, a forwarding device is provided. The forwarding device is a leaf node applied to a P2MP-based BIER multicast tree, the forwarding device does not support to process a bit string in a BIER header, and the forwarding device may implement a function of the multicast data packet processing method provided in any one of the third aspect to the possible implementations of the third aspect. The function may be implemented by hardware, or may be implemented by hardware executing corresponding software. The hardware or the software includes one or more units corresponding to the foregoing function. For example, the forwarding device may include a receiving unit, a processing unit, and a sending unit.

In a possible implementation of the sixth aspect, a structure of the forwarding device includes a processor, a memory, a communications interface, and a bus, and the processor, the memory, and the communications interface are connected by using the bus. The memory is configured to store program code, and when the program code is executed by the processor, the forwarding device is enabled to perform steps in the multicast data packet processing method provided in any one of the third aspect to the possible implementations of the third aspect.

According to another aspect of this application, a computer readable storage medium is provided. The computer readable storage medium stores an instruction. When the instruction is run on a computer, the computer is enabled to perform the multicast data packet processing method provided in any one of the first aspect or the possible implementations of the first aspect.

According to another aspect of this application, a computer readable storage medium is provided. The computer readable storage medium stores an instruction. When the instruction is run on a computer, the computer is enabled to perform the multicast data packet processing method provided in any one of the second aspect or the possible implementations of the second aspect.

According to another aspect of this application, a computer program product including an instruction is provided. When the computer program product is run on a computer, the computer is enabled to perform the multicast data packet processing method according to any one of the first aspect or the possible implementations of the first aspect.

According to another aspect of this application, a computer program product including an instruction is provided. When the computer program product is run on a computer, the computer is enabled to perform the multicast data packet processing method according to any one of the second aspect or the possible implementations of the second aspect.

It may be understood that any one of the above provided apparatus, computer storage medium, or computer program product for the multicast data packet processing method is configured to perform the corresponding method provided above. Therefore, for beneficial effects that can be achieved by the apparatus, the computer storage medium, or the computer program product, refer to beneficial effects in the corresponding method provided above. Details are not described herein again.

DESCRIPTION OF EMBODIMENTS

Figure 1:
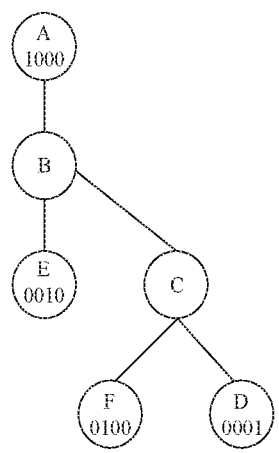
FIG. 1 is a schematic structural diagram of a multicast tree according to an embodiment of this application.

FIG. 1 is a schematic structural diagram of a multicast tree according to an embodiment of this application. The multicast tree may include a root node, an intermediate node, and a leaf node. The intermediate node may be a node other than an edge node, for example, a node B and a node C in FIG. 1. Edge nodes may include the root node and the leaf node. A node A is a root node. A node D, a node E, and a node F are leaf nodes. When the node E used as a leaf node is further used as an intermediate node, a transmission path between the node E and the node C may replace a transmission path between the node B and the node C in FIG. 1, to generate another multicast tree. When the node E used as a leaf node is further used as an intermediate node, the node E is referred to as a bud node. A structure of the multicast tree shown in FIG. 1 is merely an example, and does not constitute a limitation on this application.

A procedure of forwarding a multicast data packet includes: A root node of a multicast tree receives a multicast data packet sent by a multicast source, and the root node sends the multicast data packet to a leaf node of the multicast tree. The root node forwards the multicast data packet to a downstream node. A downstream node of a node is a next-hop node of the node on a transmission path in a direction from the root node to the leaf node in the multicast tree. If the downstream node of the root node is an intermediate node, the intermediate node sends the multicast data packet to the leaf node of the multicast tree by using a downstream node of the intermediate node. After receiving the multicast data packet, the leaf node sends, through a local port, the multicast data packet to a host connected to the local port. If the multicast tree has a bud node, the bud node sends a replicated multicast data packet through a local port in addition to sending the multicast data packet to a downstream node of the bud node. In the multicast tree shown in FIG. 1, the node A sends, to the downstream node B of the node A, a multicast data packet that comes from a multicast source. The node B replicates the multicast data packet, and separately sends the multicast data packet to the downstream nodes E and C of the node B. The node C replicates the multicast data packet, and separately sends the multicast data packet to the downstream nodes F and D of the node C. The node F and the node D may separately send the multicast data packet through respective local ports. When the node E is a bud node, the node E may replicate the multicast data packet, and separately send the multicast data packet through a local port of the node E and a port through which the node E can communicate with the downstream node C.

In the multicast tree shown in FIG. 1, a bit string that can identify tour edge nodes is used as an example to describe a relationship between a bit string, a bit position, and an edge node. A bit position corresponding to the node D is 1, a bit position corresponding to the node E is 2, a bit position corresponding to the node F is 3, and a bit position corresponding to the node A is 4. When the node D is an edge node that receives a multicast data packet, a bit string corresponding to the multicast data packet may be represented as 0001. When the node E is an edge node that receives a multicast data packet, a bit string corresponding to the multicast data packet may be represented as 0010. When the node F is an edge node that receives a multicast data packet, a bit string corresponding to the multicast data packet may be represented as 0100. When the node F and the node D are data nodes that receive a multicast data packet, a bit string corresponding to the multicast data packet may be represented as 0101. In a process of building the multicast tree, the nodes D, E, and F notify respective bit positions to respective upstream nodes by using a tree building protocol. An upstream node of a node is a previous-hop node of the node on the transmission path in the direction from the root node to the leaf node in the multicast tree. After receiving notifications from the nodes D, E, and F, the node A obtains and stores the bit positions of the nodes D, E, and F. After receiving a multicast data packet from the multicast source, the node A determines, based on information about the multicast source and information about a multicast group, that the multicast data packet needs to be sent to the nodes E and F. The node A learns, based on the bit positions of the node E and the node F, that a parameter bitstring is 0110. The node A obtains a BIER packet based on the parameter bitstring and the multicast data packet. The BIER packet includes a BIER header and the multicast data packet. A parameter bitstring included in the BIER header is 0110. The node A sends the BIER packet to the node B.

Figure 2:
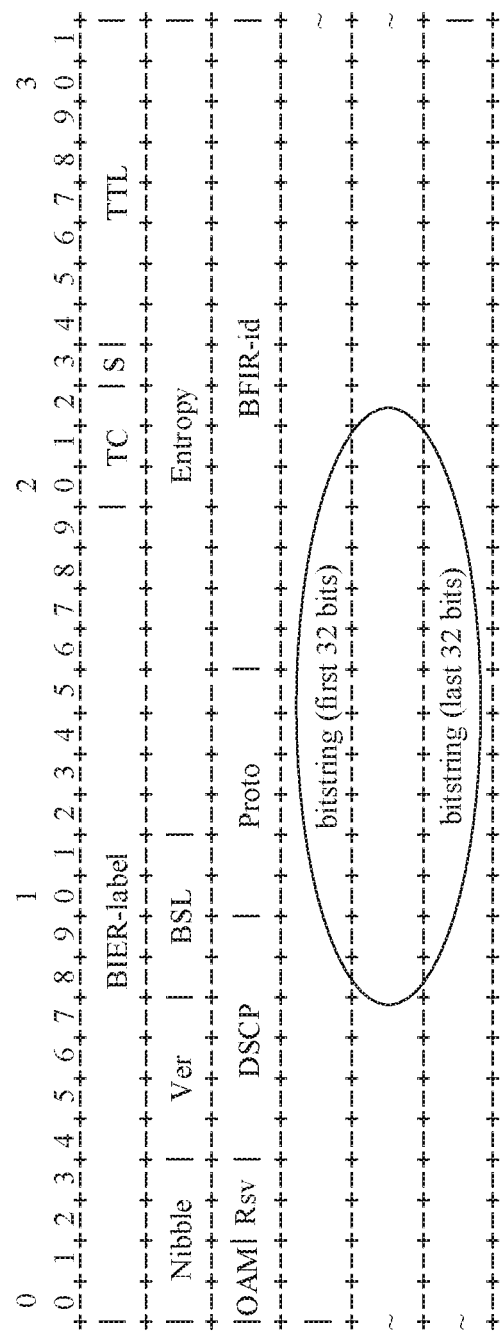
FIG. 2 is a schematic structural diagram of a BIER header according to an embodiment of this application.

As shown in FIG. 2, the BIER header includes a 32-bit BIER label, 64-bit other fields, and a parameter bitstring. The parameter BIER-label includes a label value and other information about the label. The parameter BIER-label may be used to determine a length of the parameter bitstring. The label value may occupy the first 20 bits of the parameter BIER-label. The other information about the label may occupy the last 12 bits of the parameter BIER-label. The length of the parameter bitstring may be 64 bits, 128 bits, or 256 bits. The length of the parameter bitstring may be alternatively set to another value, and the length of the parameter bitstring is not described herein by using examples one by one. For the other fields, refer to corresponding content in RFC8296.

Before forwarding a multicast data packet by using a P2MP-based BIER technology, each node included in a multicast tree builds a forwarding entry by using a control plane. After building the forwarding entry, each node included in the multicast tree sends the multicast data packet on a forwarding plane based on the forwarding entry. The following separately describes, by using different embodiments, a process of building the forwarding entry and a process of forwarding the multicast data packet.

In a forwarding entry building method provided in an embodiment of this application, a forwarding entry of each node in a multicast tree may be built hop by hop in a direction from a leaf node to a root node. The following describes in detail a forwarding entry of each node and a process of building the forwarding entry.

(1) Related Descriptions of Forwarding Entries of the Root Node, an Intermediate Node, and the Leaf Node a. Forwarding Entry of the Root Node The root node supports to use P2MP to forward a BIER packet, and the root node can identify and process a bit string in a BIER header. Forwarding entries of the root node include the following two types: a first forwarding entry and a second forwarding entry. The first forwarding entry may be represented as a mapping from a forwarding equivalence class (FEC) to a next hop label forwarding entry (NHLFE) (FEC to NHLFE, FTN). The second forwarding entry may be represented as BIER_NHLFE. The forwarding entry FTN includes a multicast source (S), a multicast group (G), a multicast tree identifier (treeid), and a bit string. For example, the forwarding entry FTN is represented as (S, G, treeid, bitstring). The parameter treeid included in the forwarding entry FTN is an identifier obtained by the root node based on a P2MP ID from a downstream node of the root node in a process of building the multicast tree. The parameter treeid included in the forwarding entry FTN is used to uniquely identify the multicast tree on the root node locally. The root node may search the forwarding entry FTN based on (S, G) in a received multicast data packet, to obtain the parameter treeid and the parameter bitstring. A leaf node that receives the multicast data packet is determined based on a bit position in the parameter bitstring in the forwarding entry FTN. In this embodiment of this application, that the P2MP ID is used as an identifier used in a tree building protocol is used as a specific example to describe a method for obtaining a forwarding entry by each node of the multicast tree. The P2MP ID may be correspondingly replaced according to a used tree building protocol. For example, if the tree building protocol is RSVP-TE, the identifier used in the tree building protocol is a P2MP session. If the tree building protocol is mLDP, the identifier used in the tree building protocol is a P2MP FEC. If the tree building protocol is PIM, the identifier used in the tree building protocol is multicast source and group information used to build the multicast tree. The multicast source and group information may be represented as (S, G). In this embodiment of this application, that the P2MP ID comes from the downstream node is used as an example for description. The P2MP ID may alternatively be obtained by using an upstream node. In this embodiment of this application, a method for obtaining the P2MP ID from the upstream node is not described again.

The forwarding entry BIER_NHLFE includes the parameter treeid, an outbound interface (outinterface), an outbound label (outlabel), and a forwarding bit mask (F-BM). For example, the forwarding entry BIER_NHLFE is represented as (treeid, outinterface, outlabel, F-BM). The root node may obtain, based on the parameter treeid in the forwarding entry FTN, the forwarding entry BIER_NHLFE including the parameter treeid. The root node may obtain the parameter outinterface, the parameter outlabel, and the parameter F-BM based on the obtained forwarding entry BIER_NHLFE. The parameter F-BM is a parameter obtained by the root node based on a bit position that is notified of by the leaf node that needs to receive the multicast data packet corresponding to (S, G). When the root node sends a BIER packet to the leaf node corresponding to the parameter bitstring, the root node may perform a logical AND operation on the parameter bitstring included in the BIER header and the parameter F-BM in the forwarding entry BIER_NHLFE. If a result of the AND operation is not 0, the root node sends the BIER packet through the outbound interface corresponding to the parameter outinterface in the forwarding entry BIER_NHLFE. A BIER label in the BIER packet sent through the outbound interface corresponding to the parameter outinterface is encapsulated as the parameter outlabel. If the result of the AND operation is 0, the root node does not send the BIER packet to the outbound interface corresponding to the parameter outinterface in the forwarding entry BIER_NHLFE.

b. Forwarding Entry of the Intermediate Node (i) The intermediate node supports a BIER technology, and at least one downstream node of the intermediate node does not support to delete data in a BIER header other than a BIER label. To be distinguished from names of the first forwarding entry and the second forwarding entry, forwarding entries of the intermediate node include the following two types: a third forwarding entry and a fourth forwarding entry. The third forwarding entry may be represented as a BIER incoming label mapping (BIER_ILM). The fourth forwarding entry may be represented as BIER_NHLFE. A type of a parameter included in the fourth forwarding entry is the same as a type of a parameter included in the forwarding entry BIER_NHLFE of the root node. Details are not described herein again. The third forwarding entry and the fourth forwarding entry may also have other names. This is not specifically limited herein.

The forwarding entry BIER_ILM includes an incoming label (inlabel), a parameter treeid, a bit string length (bitstringlen), and a first flag bit. The first flag bit may be represented as flag=checkbitstring. The forwarding entry BIER_ILM may be represented as (inlabel, treeid, bitstringlen, flag=checkbitstring), The parameter inlabel is a label of the intermediate node that is sent by the intermediate node to the root node. The parameter treeid in the forwarding entry BIER_ILM is an identifier obtained by the intermediate node based on a P2MP ID from a downstream node of the intermediate node in a process of building the multicast tree. The parameter treeid included in the forwarding entry BIER_ILM is used to uniquely identify the multicast tree on the intermediate node locally. The intermediate node uses, as the parameter inlabel, a BIER label in a received BIER packet, to obtain the forwarding entry BIER_ILM. The intermediate node may obtain the parameter treeid, the parameter bitstringlen, and the parameter flag=checkbitstring from the forwarding entry BIER_ILM. The parameter bitstringlen is used to identify a length of a parameter bitstring in a BIER header. Both a length of a parameter bitstring in a packet carrying the BIER header and a length of the parameter F-BM in the fourth forwarding entry are bitstringlen. The parameter flag=checkbitstring instructs to identify and process the parameter bitstring in the BIER header. For example, an AND operation is performed on the identified parameter bitstring in the BIER header and the parameter F-BM in the fourth forwarding entry, to determine whether to continue to send, to the downstream node, the packet carrying the BIER header. The parameter bitstringlen is notified of by the downstream node in a process in which a control plane generates an entry. In this embodiment of this application, a manner in which the parameter bitstringlen is sent by a downstream node to an upstream node is used as an example to describe a method for generating a forwarding entry by the node of the multicast tree. When a tree building protocol is RSVP-TE, the parameter bitstringlen may come from a path message sent by the upstream node to the downstream node, or may come from a reservation message (RESV message) sent by the downstream node to the upstream node. A manner of obtaining the bitstringlen is not limited in this embodiment of this application.

The forwarding entry BIER_NHLFE includes the parameter treeid, the parameter outinterface, the parameter outlabel, the parameter F-BM, and a second flag bit. The second flag bit may be represented as flag=popBIERexcluding. The parameter flag=popBIERexcluding instructs to pop out data in the BIER header other than the BIER label. The forwarding entry BIER_NHLFE may be represented as (treeid, outinterface, outlabel, F-BM, flag=popBIERexcluding). For meanings of the parameter outinterface, the parameter outlabel, and the parameter F-BM, refer to corresponding content in the second forwarding entry. For a meaning of the parameter treeid, refer to a meaning of the parameter treeid in the third forwarding entry. The intermediate node may learn, based on configuration information sent by the downstream node, that at least one downstream node does not support to delete the data in the BIER header other than the BIER label. The at least one downstream node may support to read the BIER label. The configuration information is used to indicate that the downstream node does not support to delete the data in the BIER header other than the BIER label. The intermediate node may add the parameter flag=popBIERexcluding based on the configuration information when generating a forwarding entry BIER_NHLFE corresponding to the at least one downstream node. Correspondingly, the intermediate node may obtain the parameter treeid based on the forwarding entry BIER_ILM. The intermediate node may obtain, based on the parameter treeid included in the forwarding entry BIER_ILM, the forwarding entry BIER_NHLFE including the parameter flag=popBIERexcluding. When a result of an AND operation performed on the parameter bitstring and the parameter F-BM in the forwarding entry BIER_NHLFE is not 0, the intermediate node deletes the data in the BIER header other than the BIER label, and replaces the BIER label in the BIER header with the outlabel. The intermediate node may subsequently send, with reference to the manner used by the root node, a packet that carries a P2MP label but does not carry other parameters in the BIER header after the label is replaced. The intermediate node may further configure, in a common method for a downstream node that supports the BIER technology, a forwarding entry BIER_NHLFE corresponding to the downstream node. Details are not described herein again.

(ii) The intermediate node supports a BIER technology, and plays a role of a leaf node. At least one downstream node of the intermediate node does not support to delete data in a BIER header other than a BIER label. In addition to the third forwarding entry and the fourth forwarding entry in (i), forwarding entries of the intermediate node further include a fifth forwarding entry and a sixth forwarding entry. The fifth forwarding entry may be represented as BIER_NHLFE_Leaf. The sixth forwarding entry may be represented as a multicast forwarding information base (MFIB). The forwarding entry BIER_NHLFE_Leaf includes a parameter treeid and a third flag bit. The third flag bit may be represented as flag=popBIERincluding. The parameter flag=popBIERincluding instructs to delete a BIER header from a BIER packet. Deleting the BIER header from the BIER packet is deleting, from the BIER packet, data including a length bitstringlen plus 12 bytes starting from a BIER label. The forwardin entry BIER_NHLFE_Leaf is represented as (treeid, flag=popBIERincluding). The intermediate node searches for a local MFIB by using a multicast data packet whose BIER header is deleted, and sends the multicast data packet to a local outbound interface based on the found MFIB. The MFIB may be expressed as (S, G, localmcastId). The parameter localmcastId is used to locate an entry MHB_LocalLeaf. The intermediate node that plays the role of a leaf further uses the parameter localmcastId to search for the entry MFM_LocalLeaf, to obtain the local outbound interface of the intermediate node that plays the role of a leaf. The entry MFIB_LocalLeaf may be represented as (localmcastId, outinterface).

(iii) The intermediate node supports to use P2MP to perform forwarding, and the intermediate node does not support to identify or process a parameter bitstring in a BIER header. Identifying and processing the parameter bitstring in the BIER header includes: reading the parameter bitstring in the BIER header, and using the parameter bitstring to determine whether to forward, to a downstream node, a packet carrying the BIER header. Forwarding entries of the intermediate node include the following two types: a seventh forwarding entry and an eighth forwarding entry. The seventh forwarding entry may be represented as P2MP_ILM. The eighth forwarding entry may be represented as P2MP_NHLFE.

The forwarding entry P2MP_ILM includes a parameter inlabel, a parameter treeid, and a fourth flag bit. For the parameter inlabel and the parameter treeid, refer to corresponding content in (i) and (ii). The fourth flag bit may be represented as flag=P2MP. The parameter flag=P2MP is used to instruct to use P2MP for forwarding. The forwarding entry P2MP_ILM may be represented as (inlabel, treeid, flag=P2MP). The fourth flag bit may be set by the intermediate node based on performance of the intermediate node in a process of generating a forwarding entry. The performance of the intermediate node includes: supporting P2MP forwarding and not supporting to identify and process the parameter bitstring in the BIER header. The forwarding entry P2MP_NHLFE includes a parameter treeid, a parameter outinterface, and a parameter outlabel. For meanings of the parameter treeid, the parameter outinterface, and the parameter outlabel, refer to corresponding content in (i) and (ii). The forwarding entry P2MP_NHLFE may be represented as (treeid, outinterface, outlabel). Using P2MP for forwarding indicates that forwarding is to be implemented based on a label carried in a to-be-forwarded packet and a corresponding forwarding entry. The corresponding forwarding entry may be the forwarding entry P2MP_NHLFE determined based on the parameter treeid in the forwarding entry P2MP_ILM.

(iiii) The intermediate node supports to use P2MP for forwarding. The intermediate node does not support to identify and process a parameter bitstring in a BIER header, and at least one downstream node of the intermediate node does not support to delete data in the BIER header other than a BIER label. Forwarding entries of the intermediate node include the following several types: the seventh forwarding entry in (iii) and a ninth forwarding entry. The ninth forwarding entry may be obtained by adding the second flag bit to the eighth forwarding entry in (iii). To be specific, the ninth forwarding entry may be represented as (treeid, outinterface, outlabel, flag=popBIERexcluding). For same content in the ninth forwarding entry and the eighth forwarding entry, refer to (iii). For the second flag bit, refer to corresponding content in (i).

When the intermediate node corresponding to further plays a role of a leaf node, forwarding entries of the intermediate node may further include the fifth forwarding entry and the sixth forwarding entry in (ii) in addition to the seventh forwarding entry and the ninth forwarding entry.

Any one of the foregoing flag bits is set by the intermediate node based on corresponding configuration information carried in a notification sent by the downstream node of the intermediate node. A representation manner of any flag bit is not limited to the foregoing representation manner.

c. Forwarding Entry of the Leaf Node (i) The leaf node supports to delete a BIER header, and forwarding entries of the leaf node may include the following several types: BIER_ILM represented as (inlabel, treeid, bitstringlen, flag=checkbitstring) and BIER_NHLFE_Leaf represented as (treeid, flag=popBIERincluding). Alternatively, a forwarding entry of the leaf node may be BIER_ILM represented as (inlabel, treeid, bitstringlen, flag=popBIERincluding). The parameter inlabel is a label of the leaf node. For content of the parameter bitstringlen and the parameter flag=checkbitstring, refer to corresponding content on the intermediate node. The parameter flag=popBIERincluding instructs to delete a BIER header from a BIER packet. For specific content, refer to corresponding content on the intermediate node.

(ii) The leaf node does not support to delete data in a BIER header other than a BIER label, and forwarding entries of the leaf node may include P2MP_ILM represented as (inlabel, treeid) and P2MP_NHLFE_Leaf represented as (treeid, flag=poplabel). Alternatively, a forwarding entry of the leaf node may be P2MP_ILM represented as (inlabel, treeid, flag=poplabel). The parameter flag=poplabel instructs to delete a label from a packet, and the label may be a BIER label or a P2MP label.

(iii) If the leaf node plays a role of an intermediate node, for a forwarding entry of the leaf node that plays the role of an intermediate node, refer to the forwarding entry of the intermediate node that plays the role of a leaf node in b.

It should be noted that a parameter treeid in the forwarding entry of the leaf node may be an identifier obtained by the leaf node based on a P2MP ID in a process of building the multicast tree. The parameter treeid is used to uniquely identify the multicast tree on the leaf node locally.

(2) Related Descriptions of Building Forwarding Entries of the Root Node, an Intermediate Node, and the Leaf Node The leaf node of the multicast tree learns of a P2MP identifier (identifier, ID) corresponding to the multicast tree. The P2MP ID includes: an IP address of the root node and an identifier of the multicast tree in which the leaf node is located. The identifier of the multicast tree in which the leaf node is located may be an identifier represented by using a sequence number. The leaf node of the multicast tree learns of a next-hop node in an upstream direction. As shown in FIG. 1, a node A is a next-hop node of a node B in an upstream direction, the node B is a next-hop node of a node E in the upstream direction, a node C is a next-hop node of a node D in the upstream direction, and the node B is a next-hop node of the node C in the upstream direction. The leaf node of the multicast tree may learn of a bit position corresponding to the leaf node. The node D may send a bit mask (bitmask) whose content is 0001, to notify that a bit position of the node D is 1. Likewise, the node E may send a parameter bitmask whose content is 0010, to notify that a bit position of the node E is 2. A node F may send a parameter bitmask whose content is 0100, to notify that a bit position of the node F is 3. The leaf node of the multicast tree may send a label used to identify the leaf node to an upstream node of the leaf node. The leaf node of the multicast tree may further send, to the upstream node of the leaf node, configuration information used to indicate whether the leaf node supports to delete data in a BIER header other than a BIER label. In this way, the leaf node of the multicast tree may send the parameter bitmask, the P2MP ID, and the label of the leaf node to the next-hop node in the upstream direction of the leaf node. The intermediate node may obtain a corresponding forwarding entry in (1) based on the foregoing information sent by the leaf node. The leaf node may obtain the corresponding forwarding entry in (1) based on the configuration information and the label of the leaf node. As shown in FIG. 1, it is assumed that a label of the node D may be label<byD>, and the node D sends (P2MP ID, label<byD>, bitmask=0001, configuration information) to the node C. A label of the node F may be label<byF>, and the node F sends (P2MP ID, label<byF>, bitmask=0100, configuration information) to the node C. A label of the node E may be label<byE>, and the node E sends (P2MP ID, label<byE>, bitmask=0010, configuration information) to the node B. The intermediate node may use label<by node> as a parameter outlabel. The intermediate node obtains a parameter treeid based on the identifier that is of the multicast tree and that is in the P2MP ID. The intermediate node may use the parameter bitmask as a parameter F-BM based on a capability of the intermediate node. The intermediate node may set a flag based on received configuration information.

The intermediate node obtains a corresponding bit string based on a parameter bitmask sent by a downstream node. Specifically, the intermediate node may obtain the corresponding bit string by performing an OR operation on the parameter bitmask from the downstream node. The intermediate node may send the supported capability, a label of the intermediate node, and the obtained parameter bitstring to the IP address that is of the root node and that is included in the P2MP ID. Specifically, a method for sending the supported capability, the label of the intermediate node, and the obtained parameter bitstring may include: The intermediate node obtains a next-hop node in an upstream direction based on an IP address of the root node; and the intermediate node sends the label of the intermediate node and the obtained parameter bitstring to the next-hop node in the upstream direction. The capability supported by the intermediate node may be sent by using the configuration information. For the capability supported by the intermediate node, refer to the corresponding descriptions in (1). The intermediate node may obtain a forwarding entry related to a parameter inlabel in (1) based on the capability of the intermediate node, the obtained parameter treeid, and the label of the intermediate node. The label of the intermediate node is the parameter inlabel in the forwarding entry of the intermediate node.

For example, as shown in FIG. 1, a label of the node C may be label<byC>, and the node C performs an "or" operation on two parameters bitmask from the nodes D and F, to obtain bitmask=0101 obtained after the "or" operation. The node C obtains, based on the IP address of the root node, that a next hop in a direction to the root node is the node B. The node C sends information (P2MP ID, label<byC>, bitmask=0101, configuration information) to the node B. The configuration information sent by the node C is used to indicate a capability of the node C and a capability of a leaf node connected to the node C. The node C may build a corresponding forwarding entry based on label<byC> and information that is sent by the nodes D and F. A label of the node B may be label<byB>. The node B performs an "or" operation on two parameters bitmask from the nodes E and C, to obtain bitmask=0111 obtained after the "or" operation. The node B sends (P2MP ID, label<byB>, bitmask=0111) to the node A based on the IP address of the root node. The node B may build a corresponding forwarding entry based on label<byB> and information that is sent by the nodes E and C.

Related description of building the forwarding entry by the root node: After receiving information sent by a downstream node, the root node may build, based on the information sent by the downstream node, the forwarding entry that is of the root node and that is described in (1). For example, as shown in FIG. 1, the node A obtains a corresponding forwarding entry based on information from the node B, a capability of the node A, and a label of the node A.

For specific descriptions of a forwarding entry of a root node, a forwarding entry of an intermediate node, and a forwarding entry of a leaf node that are of a multicast tree in the following embodiments corresponding to FIG. 3, FIG. 4, FIG. 5, or FIG. 6, refer to corresponding content in (1). For a specific manner of generating a forwarding entry by any node of the multicast tree in the following embodiments corresponding to FIG. 3, FIG. 4, FIG. 5, or FIG. 6, refer to corresponding content in (2).

Figure 3:
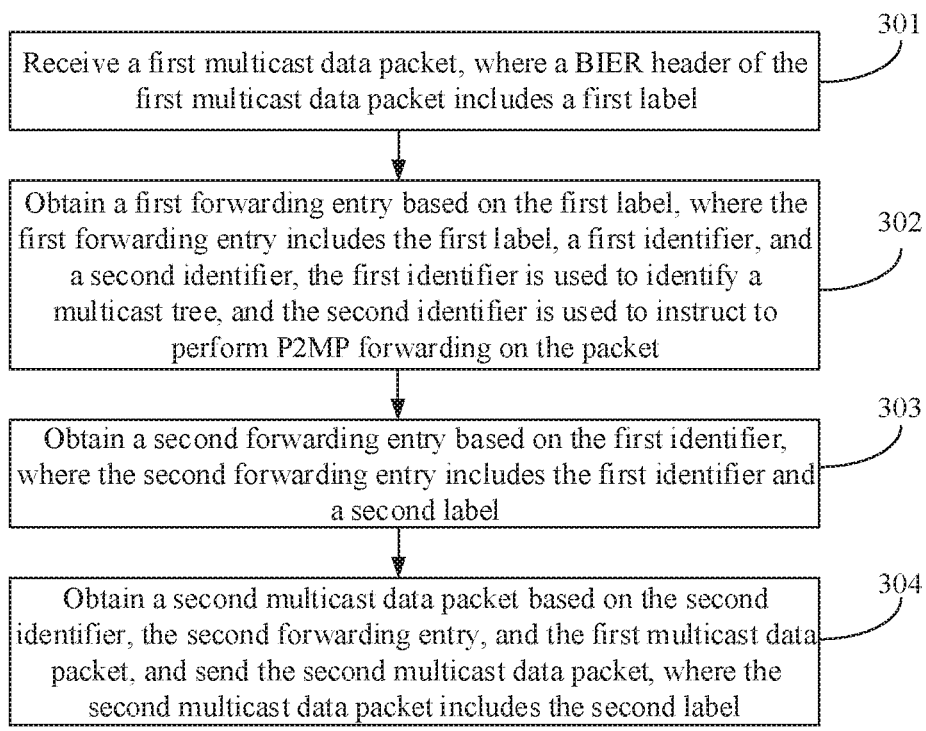
FIG. 3 is a schematic flowchart of the $1^{st}$ multicast data packet processing method according to an embodiment of this application.

FIG. 3 is a schematic flowchart of a multicast data packet processing method according to an embodiment of this application. This method is applied to a P2MP-based BIER multicast tree. An intermediate node of the multicast tree supports to use P2MP to forward a received packet. The following describes the method provided in this embodiment of this application with reference to FIG. 3.

Step 301: The intermediate node receives a first multicast data packet, where a BIER header of the first multicast data packet includes a first label.

If the intermediate node does not support to process data in a BIER header other than a BIER label, for example, does not support to perform identification processing on a parameter in the BIER header other than the BIER label, the intermediate node uses P2MP to forward the received packet. The received packet may be a multicast data packet that carries the BIER header or a multicast data packet that does not carry the parameter in the BIER header other than the BIER label. The parameter in the BIER header other than the BIER label may be a parameter bitstring. The identification processing may include: reading the parameter bitstring, an operation (AND operation), and a subsequent forwarding action. The forwarding action may be determining, based on an AND result, whether to perform a forwarding operation for a next hop.

The first label in the BIER header of the first multicast data packet is a label of the intermediate node. The first multicast data packet may be sent by an upstream node of the intermediate node to the intermediate node. The upstream node may be a root node, or may be an intermediate node other than the intermediate node. The root node supports to identify and process the parameter bitstring in the BIER header. When the root node needs to send a multicast data packet to a leaf node in the multicast tree, the root node may obtain, based on (S, G) and a forwarding entry FTN in the multicast data packet, a parameter treeid and a parameter bitstring that are used as first identifiers. The root node finds a forwarding entry BIER_NHLFE (treeid, outinterface, outlabel, F-BM) based on the obtained parameter treeid. The root node performs an AND operation on the parameter bitstring and the parameter F-BM. When a result of the logical AND operation is not 0, the first multicast data packet is obtained based on the parameter bitstring and the parameter outlabel that is used as the first label. The root node sends the first multicast data packet to an outbound interface identified by the parameter outinterface, to send the first multicast data packet to the intermediate node.

When the upstream node of the intermediate node is also an intermediate node, the intermediate node used as the upstream node may have a same capability as the root node, a BIER packet may be forwarded with reference to the method used by the root node. If the intermediate node used as the upstream node does not support to process the data in the BIER header other than the BIER label, the intermediate node used as the upstream node may process the received first multicast data packet in the following method provided in this embodiment of this application.

Step 302: The intermediate node obtains a first forwarding entry based on the first label, where the first forwarding entry includes the first label, a first identifier, and a second identifier, the first identifier is used to identify the multicast tree, and the second identifier is used to instruct to perform P2MP forwarding on the packet.

The intermediate node may obtain the first forwarding entry based on the first label. The first identifier in the first forwarding entry is used to identify the multicast tree, and the second identifier is used to instruct to perform P2MP forwarding on the packet. For example, the first identifier may be the parameter treeid included in the forwarding entry of the intermediate node mentioned in the foregoing embodiment. For example, the second identifier may be the parameter flag=P2MP included in the forwarding entry of the intermediate node mentioned in the foregoing embodiment. Correspondingly, the first forwarding entry may include the forwarding entry P2MP_ILM represented as (inlabel, treeid, flag=P2MP) that is on the intermediate node and that is mentioned in the foregoing embodiment.

Step 303: The intermediate node obtains a second forwarding entry based on the first identifier, where the second forwarding entry includes the first identifier and a second label.

The intermediate node may obtain the second forwarding entry based on the first identifier. The second label included in the second forwarding entry is a label of a downstream node of the intermediate node that is sent by the downstream node. For example, the second forwarding entry may include a forwarding entry P2MP_NHLFE represented as (treeid, outlabel). The intermediate node may obtain the second forwarding entry based on the treeid in the forwarding entry P2MP_ILM expressed as (inlabel, treeid, flag=P2MP). The parameter outlabel in the second forwarding entry may be referred to as the second label. Optionally, the second entry may further include the parameter outinterface included in the forwarding entry P2MP_NHLFE that is on the intermediate node and that is mentioned in b.

Step 304: The intermediate node obtains a second multicast data packet based on the second identifier, the second forwarding entry, and the first multicast data packet, and sends the second multicast data packet, where the second multicast data packet includes the second label.

When the intermediate node obtains the second identifier, the second forwarding entry, and the first multicast data packet, the intermediate node determines, based on the second identifier, to perform P2MP forwarding. After determining to perform P2MP forwarding, the intermediate node may not need to perform identification processing on a received parameter in the BIER header other than the BIER label. The intermediate node processes the first multicast data packet based on the second label in the second forwarding entry, to obtain the second multicast data packet. The BIER label in the BIER header of the second multicast data packet is the second label. The intermediate node may send the second multicast data packet to the downstream node of the intermediate node.

When the downstream node of the intermediate node supports to delete the data in the BIER header other than the BIER label or does not support to delete the data in the BIER header other than the BIER label, methods for obtaining and sending, by the intermediate node, the second data multicast packet in step 304 are different. The following separately describes the methods.

In a manner, if the downstream node of the intermediate node supports to delete the data in the BIER header other than the BIER label, the second forwarding entry may further include an outbound interface. Optionally, the outbound interface may be determined based on an identifier of the downstream node of the intermediate node, and the outbound interface may be the same as or different from an interface through which the intermediate node receives information sent by the downstream node of the intermediate node. Correspondingly, step 304 may specifically include: The intermediate node replaces the first label in the first multicast data packet with the second label in the second forwarding entry based on the second identifier, to obtain the second multicast data packet; and the intermediate node sends the second multicast data packet to the downstream node of the intermediate node through the outbound interface in the second forwarding entry. For example, if the second identifier is flag=P2MP, and the second forwarding entry includes a forwarding entry P2MP_NHLFE represented as (treeid, outinterface, outlabel), the intermediate node may replace the BIER label in the BIER header of the first multicast data packet with the parameter outlabel, to obtain the second multicast data packet, and send the second multicast data packet to the downstream node of the second multicast data packet by using the parameter outinterface. In this case, both the first multicast data packet and the second multicast data packet may be packets carrying the BIER header.

In another manner, when the downstream node of the intermediate node does not support to delete the data in the BIER header other than the BIER label, the second forwarding entry further includes a third identifier and an outbound interface, and the third identifier is used to instruct to delete the data in the BIER header other than the BIER label. Optionally, the outbound interface may alternatively be determined based on an identifier of the downstream node of the intermediate node, and the outbound interface may be the same as or different from an interface through which the intermediate node receives information sent by the downstream node of the intermediate node. Correspondingly, step 304 may specifically include: The intermediate node replaces, based on the second identifier, the first label included in the first multicast data packet with the second label, to obtain a label-replaced first multicast data packet; the intermediate node deletes, based on the third identifier, data in the BIER header of the label-replaced first multicast data packet other than the second label after the label is replaced, to obtain the second multicast data packet, to be specific, the second multicast data packet includes only the second packet and a multicast IP packet; and the intermediate node sends the second multicast data packet through the outbound interface. For example, the second identifier is flag=P2MP, the third identifier is flag=popBIERexcluding, and the second forwarding entry includes a forwarding entry P2MP_NHLFE represented as (treeid, outinterface, outlabel, flag=popBIERexcluding). In this case, the intermediate node may replace the BIER label in the BIER header of the first multicast data packet with the parameter outlabel (the second label), to obtain the label-replaced first multicast data packet, and delete the data in the BIER header other than the second label based on the parameter flag=popBIERexcluding, to obtain the second multicast data packet. To be specific, the second multicast data packet includes the second packet and the multicast IP packet. The intermediate node sends the second multicast data packet to the downstream node of the intermediate node by using the parameter outinterface. In this case, the first multicast data packet may be a packet that carries the BIER header, and the second multicast data packet may be a packet that carries a P2MP label but does not carry another parameter in the BIER header.

When the downstream node of the intermediate node is a leaf node, the leaf node may receive the second multicast data packet. The leaf node may obtain a third forwarding entry based on the first identifier. The third forwarding entry includes the first identifier and a fourth identifier, and the fourth identifier is used to instruct to delete the second label. Therefore, the leaf node may delete the second label from the second multicast data packet based on the third identifier, to obtain the multicast IP packet. The leaf node reads a source IP and a destination IP (multicast group IP) in an IP header of the multicast IP packet, finds, through matching, a local multicast forwarding entry, determines a local outbound interface based on the local multicast forwarding entry, and sends the multicast IP packet to the local outbound interface. For example, the third forwarding entry may include a forwarding entry P2MP_NHLFE_Leaf (treeid, flag=poplabel), the parameter treeid may be the first identifier, and the parameter flag=poplabel may be the fourth identifier. The multicast forwarding entry may include an MFIB (S, G, localmcastId), (S, G) is referred to as multicast source and group information, and the parameter localmcastId may be used to indicate the local outbound interface. The parameter flag=poplabel is used to instruct to pop out a label, and the label may be a BIER label or a P2MP label.

Correspondingly, before the leaf node obtains the third forwarding entry based on the first identifier, the leaf node may further generate the third forwarding entry. Specifically, the leaf node may generate the third forwarding entry based on indication information and the first identifier. The indication information is used to instruct the leaf node to delete the BIER label when locally forwarding a packet, and the fourth identifier is an identifier obtained based on the indication information.

When the intermediate node is further used as a leaf node, the intermediate node may send the multicast IP packet to the local outbound interface of the intermediate node according to the foregoing method for processing the second multicast data packet by the leaf node. For details, refer to the descriptions of the leaf node. The details are not described in this embodiment of this application.

Further, before the intermediate node processes the first multicast data packet, the intermediate node may further generate the first forwarding entry and the second forwarding entry that are required for forwarding the first multicast data packet. Specifically, referring to FIG. 4, before the intermediate node obtains the first forwarding entry based on the first label (namely, step 302), the method may further include step 300a.

Step 300a: The intermediate node generates a first forwarding entry based on first configuration information, the first label, and the first identifier, where the first configuration information is used to indicate that the intermediate node uses P2MP to forward a BIER packet, and the second identifier is an identifier obtained based on the first configuration information. The second identifier is an identifier obtained based on the first configuration information. A manner of obtaining the second identifier may include: generating the second identifier based on the first configuration information, or searching a correspondence table based on the first configuration information to obtain the second identifier. When the intermediate node uses P2MP to forward the BIER packet, the first configuration information may be configured for the intermediate node, so that the intermediate node obtains the second identifier based on the first configuration information, and generates the first forwarding entry based on the first label, the first identifier, and the second identifier. For example, the intermediate node may obtain an identifier flag=P2MP based on the first configuration information, and generate the first forwarding entry based on the first label label<by node 1> (the node 1 represents the intermediate node) and the parameter treeid used as the first identifier. The first forwarding entry may be a forwarding entry P2MP_ILM represented as (inlabel, treeid, flag=P2MP). The parameter inlabel is a label of the intermediate node.

Figure 4:
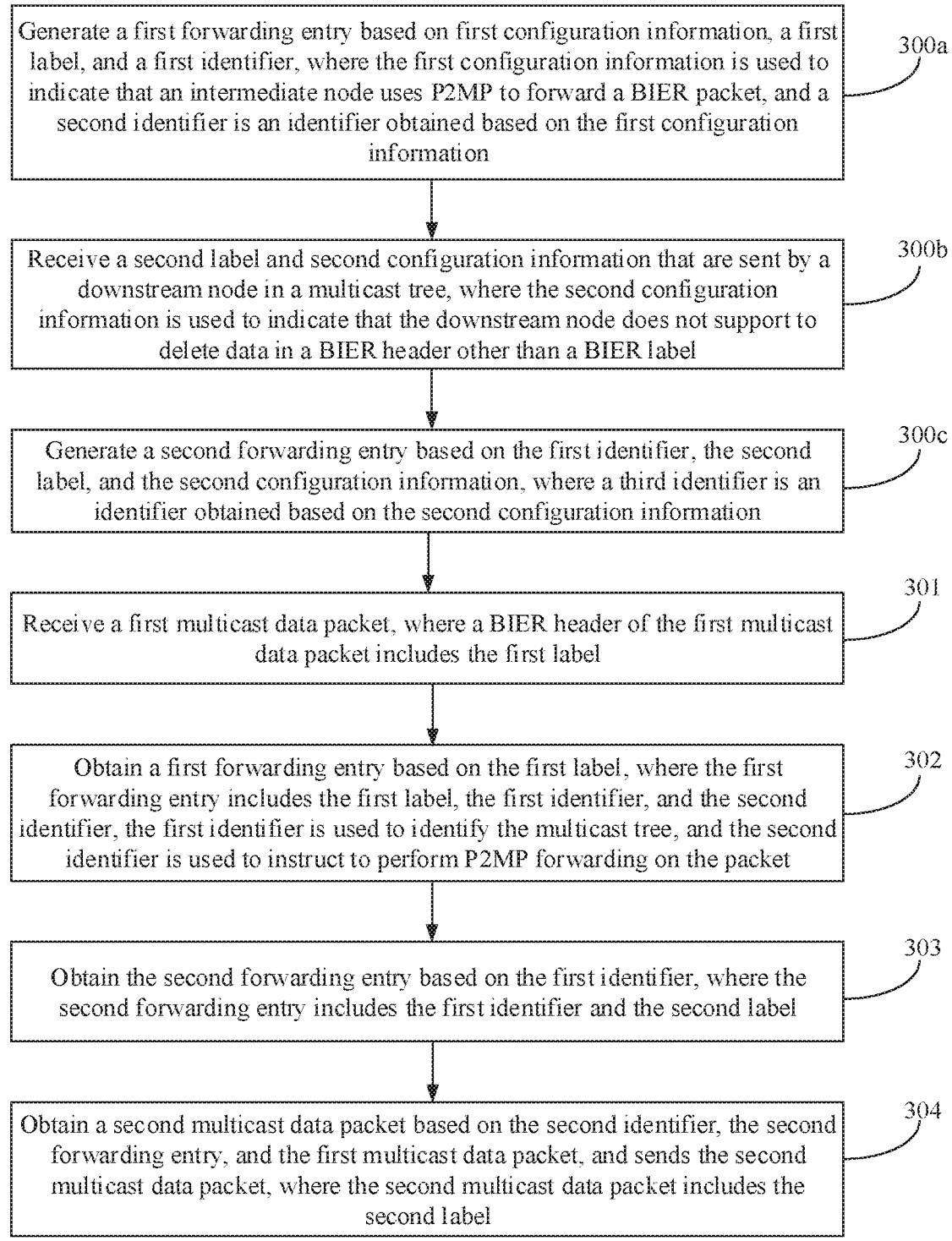
FIG. 4 is a schematic flowchart of the $2^{nd}$ multicast data packet processing method according to an embodiment of this application.

Specifically, referring to FIG. 4, before the intermediate node obtains the second forwarding entry based on the first identifier (namely, step 303), the method may further include steps 300b and step 300c. In FIG. 4, an example in which step 300a to step 300c are performed before step 301 is used for description.

Step 300b: The intermediate node receives a second label and second configuration information that are sent by a downstream node in the multicast tree, where the second configuration information is used to indicate that the downstream node does not support to delete the data in the BIER header other than the BIER label.

When the downstream node of the intermediate node does not support to delete the data in the BIER header, other than the BIER label the downstream node may send the second configuration information to the intermediate node, and send the second label to the intermediate node.

Step 300c: The intermediate node generates the second forwarding entry based on the first identifier, the second label, and the second configuration information, where the third identifier is an identifier obtained based on the second configuration information.

The third identifier is an identifier obtained based on the second configuration information. A manner of obtaining the third identifier may include: generating the third identifier based on the second configuration information, or searching the correspondence table based on the second configuration information to obtain the third identifier. When the intermediate node receives the second configuration information, the intermediate node may obtain the third identifier based on the second configuration information, and generate the second forwarding entry based on the first identifier, the second label, and the third identifier. For example, the intermediate node may obtain an identifier flag=popBIERexcluding based on the second configuration information, and generate the second forwarding entry based on the parameter treeid used as the first identifier, a label label<by node 2> (the node 2 represents the downstream node of the intermediate node) used as the second label, and the parameter flag=popBIERexcluding used as the third identifier. The second forwarding entry may be represented as P2MP_NHLFE (treeid, outinterface, outlabel, flag=popBIERexcluding). The parameter outlabel is label<by node2>, namely, a label of the downstream node of the intermediate node.

In this embodiment of this application, if the intermediate node cannot identify and process a bit string in the BIER header, but supports to use P2MP to forward the BIER packet, when the intermediate node receives the first multicast data packet and obtains the first forwarding entry and the second forwarding entry, the intermediate node may process the first multicast data packet based on the second forwarding entry and the second identifier that is in the first forwarding entry and that is used to instruct to perform P2MP forwarding on the packet, to obtain the second multicast data packet, and does not need to read or analyze the BIER header of the first multicast data packet during processing, so that the BIER packet can be forwarded without upgrading hardware of the node, thereby reducing hardware upgrading costs. In addition, when the downstream node of the intermediate node does not support to delete the data in the BIER header other than the BIER label, when forwarding a multicast data packet, the intermediate node may further delete data in a BIER header of the multicast data packet other than a BIER label, so that the downstream node of the intermediate node can implement processing or forwarding on the received multicast data packet. In this way, the BIER packet can be forwarded without upgrading hardware of the node, and hardware upgrading costs are further reduced.

Figure 5:
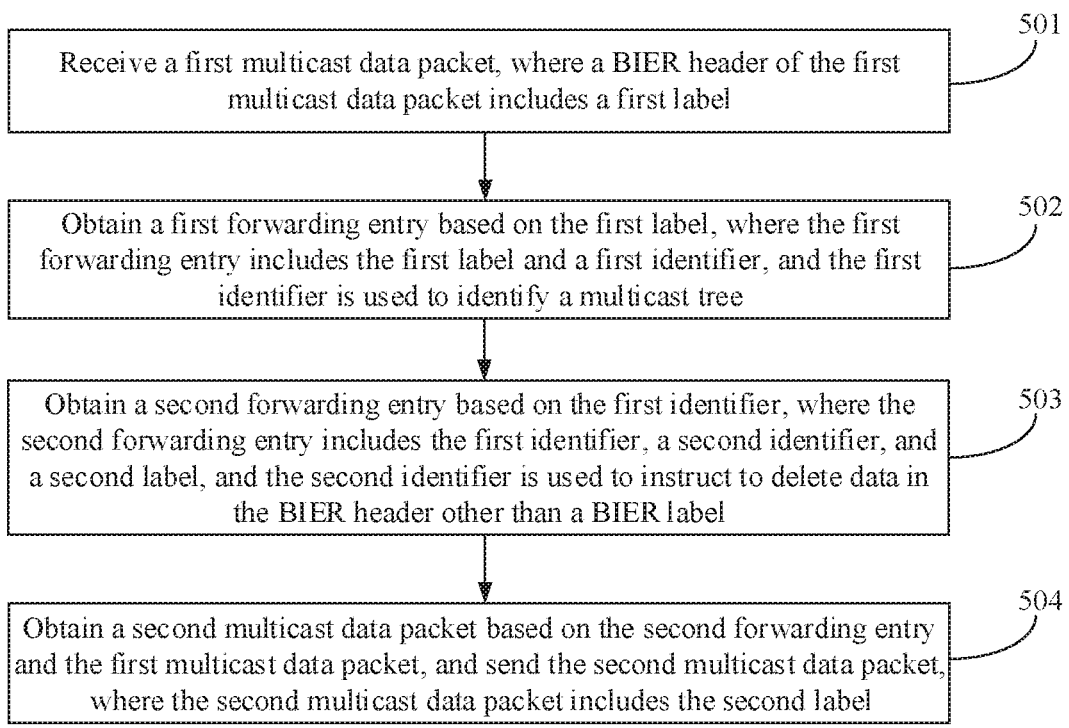
FIG. 5 is a schematic flowchart of the $3^{rd}$ multicast data packet processing method according to an embodiment of this application.

FIG. 5 is a schematic flowchart of a multicast data packet processing method according to an embodiment of this application. The method is applied to a P2MP-based BIER multicast tree, and an intermediate node of the multicast tree supports to delete data in a BIER header other than a BIER label. Referring to FIG. 5, the method includes the following several steps.

Step 501: The intermediate node receives a first multicast data packet, where a BIER header of the first multicast data packet includes a first label.

For details, refer to corresponding content in 301 in the embodiment corresponding to FIG. 4 or FIG. 3.

Step 502: The intermediate node obtains a first forwarding entry based on the first label, where the first forwarding entry includes the first label and a first identifier, and the first identifier is used to identify the multicast tree.

The intermediate node may obtain the first forwarding entry based on the first label. The first identifier in the first forwarding entry is used to identify the multicast tree. For example, the first identifier may be the parameter treeid in the forwarding entry provided in the foregoing embodiments, the first label is a label of the intermediate node, and the first forwarding entry may include a forwarding entry P2MP_ILM represented as (inlabel, treeid). The parameter inlabel may be a label of the intermediate node.

Step 503: The intermediate node obtains a second forwarding entry based on the first identifier, where the second forwarding entry includes the first identifier, a second identifier, and a second label, and the second identifier is used to instruct to delete the data in the BIER header other than the BIER label.

The intermediate node may obtain the second forwarding entry based on the first identifier. The second label included in the second forwarding entry is a label that is allocated and sent by a downstream node of the intermediate node to the intermediate node. For example, the second forwarding entry may include a forwarding entry P2MP_NHLFE represented as (treeid, outlabel, flag=popBIERexcluding). The intermediate node may obtain the second forwarding entry based on the first identifier treeid, the parameter outlabel in the second forwarding entry may be the second label, and the parameter flag=popBIERexcluding may be the second identifier.

Step 504: The intermediate node obtains a second multicast data packet based on the second forwarding entry and the first multicast data packet, and sends the second multicast data packet, where the second multicast data packet includes the second label.

When the intermediate node receives the first multicast data packet and obtains the second forwarding entry, the intermediate node may process the first multicast data packet based on the second forwarding entry, to obtain the second multicast data packet including the second label. The intermediate node may send the second multicast data packet to the downstream node of the intermediate node.

The second forwarding entry may further include an outbound interface. The outbound interface may be determined based on an identifier of the downstream node of the intermediate node, and the outbound interface may be the same as or different from an interface through which the intermediate node receives information sent by the downstream node of the intermediate node. Specifically, the intermediate node may delete, based on the second identifier in the second forwarding entry, the data in the BIER header of the first multicast data packet other than the first label, to obtain a data-deleted first multicast data packet. The intermediate node replaces the first label included in the data-deleted first multicast data packet with the second label, to obtain the second multicast data packet. The intermediate node sends the second multicast data packet to the downstream node of the intermediate node through the outbound interface in the second forwarding entry. In this case, the first multicast data packet may be a packet that carries a BIER header, and the second multicast data packet may be a packet that carries a P2MP label but does not carry another parameter in the BIER header.

When the downstream node of the intermediate node is a leaf node, the leaf node may receive the second multicast data packet. The leaf node may obtain a third forwarding entry based on the first identifier. The third forwarding entry includes the first identifier and a fourth identifier, and the fourth identifier is used to instruct to delete the second label. Therefore, the leaf node may delete the second label from the second multicast data packet based on the third identifier, to obtain the multicast IP packet. The leaf node reads a source IP and a destination IP (multicast group IP) in an IP header of the multicast IP packet, finds, through matching, a local multicast forwarding entry, determines a local outbound interface based on the local multicast forwarding entry, and sends the multicast IP packet to the local outbound interface. For example, the third forwarding entry may include a forwarding entry P2MP_NHLFE_Leaf represented as (treeid, flag=poplabel), the parameter treeid included in the forwarding entry P2MP_NHLFE_Leaf may be the first identifier, and the parameter flag=poplabel may be the fourth identifier. The multicast forwarding entry may include an MFIB (S, G, localmcastId), and the parameter localmcastId may be used to indicate the local outbound interface. For a meaning of the parameter flag=poplabel, refer to corresponding content in the embodiment corresponding to FIG. 3 or FIG. 4. For a method for obtaining, by the leaf node, the third forwarding entry and the fourth identifier, refer to corresponding content in the embodiment corresponding to FIG. 3.

Figure 6:
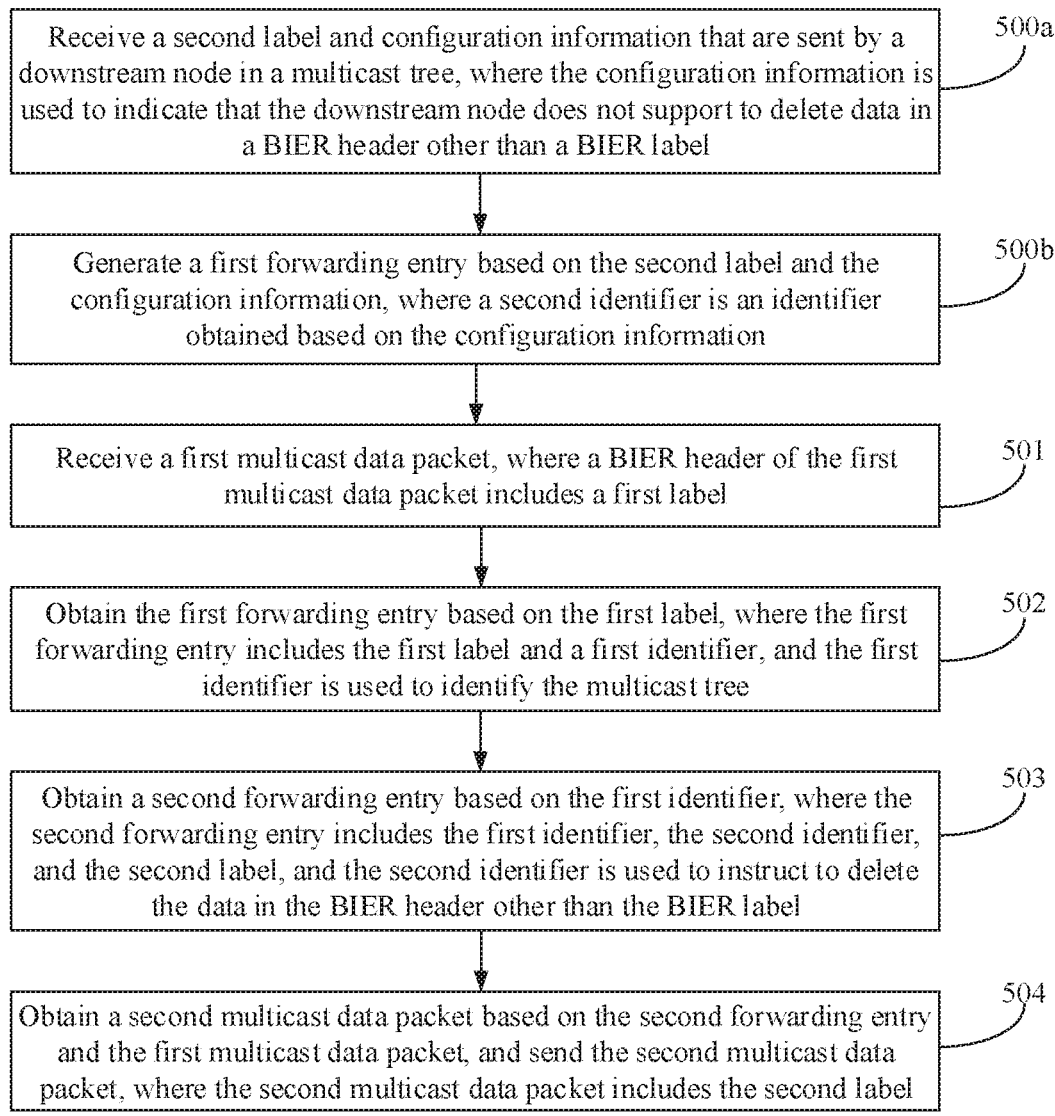
FIG. 6 is a schematic flowchart of the $4^{th}$ multicast data packet processing method according to an embodiment of this application.

Specifically, referring to FIG. 6, before the intermediate node obtains the second forwarding entry based on the first identifier (namely, step 503), the method may further include steps 500a and step 500b. In FIG. 6, an example in which step 500 is performed before step 501 is used for description.

Step 500a: The intermediate node receives a second label and configuration information that are sent by a downstream node in the multicast tree, where the configuration information is used to indicate that the downstream node does not support to delete the data in the BIER header other than the BIER label.

When the downstream node of the intermediate node does not support to delete the data in the BIER header other than the BIER label, the downstream node may send the configuration information to the intermediate node, and send, to the intermediate node, the second label allocated by the downstream node.

Step 500b: The intermediate node generates the first forwarding entry based on the second label and the configuration information, where the second identifier is an identifier obtained based on the configuration information.

The second identifier is an identifier obtained based on the configuration information. For a method for obtaining the second identifier, refer to the embodiment corresponding to FIG. 4 or FIG. 3. When the intermediate node receives the configuration information, the intermediate node may obtain the second identifier based on the configuration information, and generate the second forwarding entry based on the first identifier, the second label, and the second identifier. For example, the intermediate node may obtain an identifier flag=popBIERexcluding based on the configuration information, and generate the second forwarding entry based on the parameter treeid used as the first identifier, a label label<by node 2> (the node 2 represents the downstream node of the intermediate node) used as the second label, and the parameter flag=popBIERexcluding used as the second identifier. The second forwarding entry may be a forwarding entry P2MP_NHLFE represented as (treeid, outinterface, outlabel, flag=popBIERexcluding). The parameter outlabel is label<by node 2>, namely, a label of the downstream node of the intermediate node.

In a manner, before the intermediate node obtains the first forwarding entry based on the first label, the intermediate node may further generate the first forwarding entry based on the first identifier and the first identifier. For example, the intermediate node generates the first forwarding entry based on a label label<by node 1> (the node 1 represents the intermediate node) used as the first label and the parameter treeid used as the first identifier. The first forwarding entry is a forwarding entry P2MP_ILM represented as (inlabel, treeid). The parameter inlabel is label<by node 1>, namely, a label of the intermediate node.

The multicast tree provided in this embodiment of this application may include both a node that supports a BIER technology and a node that does not support the BIER technology. Specifically, processing may be performed based on an operation corresponding to a flag in a forwarding entry of a node. Details are not described herein again. The node that does not support the BIER technology is a node that does not support to delete the data in the BIER header other than the BIER label.

For ease of understanding, five scenarios shown in FIG. 7 to FIG. 11 are used as examples for description herein.

Figure 7:
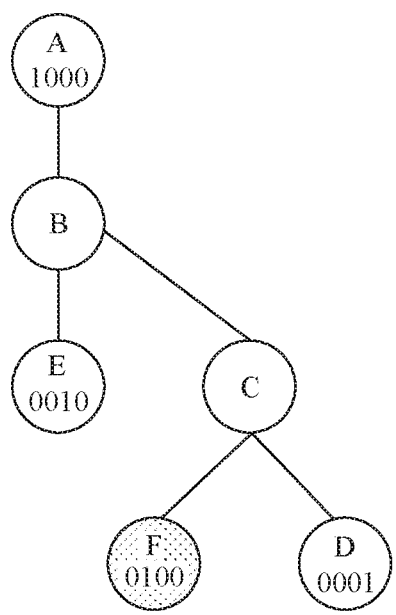
FIG. 7 is a schematic diagram of forwarding a first BIER packet according to an embodiment of this application.

In FIG. 7, a node F does not support to delete data in a BIER header other than a BIER label, and another nodes supports to delete the data in the BIER header other than the BIER label. In this case, a node C may generate a corresponding forwarding entry based on information from F. The node C may process a received BIER packet in a corresponding manner based on a forwarding entry of the node C. For example, when forwarding a multicast data packet to the node F, the node C may delete data in a BIER header of the multicast data packet other than a BIER label. A BIER header of a multicast data packet received by the node F includes only the BIER label. In addition, the node C may determine, based on whether a forwarding entry of the node C includes a parameter flag=P2MP, whether to perform P2MP forwarding.

Figure 8:
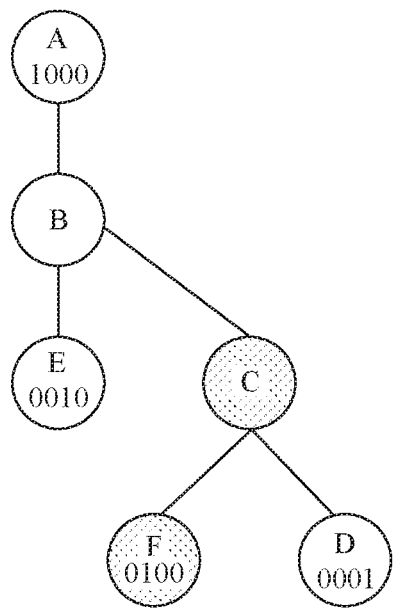
FIG. 8 is a schematic diagram of forwarding a second BIER packet according to an embodiment of this application.

In FIG. 8, the node C and the node F do not support to delete data in a BIER header other than a BIER label, and another node supports to delete the data in the BIER header other than the BIER label. In this case, a node B may process a received BIER packet in the method performed by the node C in FIG. 7. A BIER header of a multicast data packet received by the node C includes only the BIER label. A BIER header of a multicast data packet forwarded by the node C to the node F and the node D includes only the BIER label. Because the node D supports a BIER technology, the BIER header of the multicast data packet sent by the node C includes only the BIER label, and the node D may be configured not to delete the data in the BIER header other than the BIER label. In addition, the node B and the node C may determine, based on whether forwarding entries of the node B and the node C include a parameter flag=P2MP, whether to perform P2MP forwarding.

Figure 9:
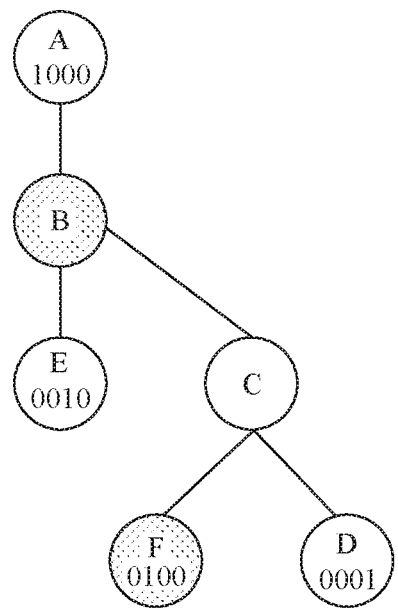
FIG. 9 is a schematic diagram of forwarding a third BIER packet according to an embodiment of this application.

In FIG. 9, the node B and the node F do not support to delete data in a BIER header other than a BIER label, and another node supports to delete the data in the BIER header other than the BIER label. In this case, a node A may process a received BIER packet in the method performed by the node C in FIG. 7. Nodes C, E, and D may process the received multicast data packet in a manner of the node D in FIG. 8. In addition, the node B and the node C may determine, based on whether forwarding entries of the node B and the node C include a parameter flag=P2MP, whether to perform P2MP forwarding.

Figure 10:
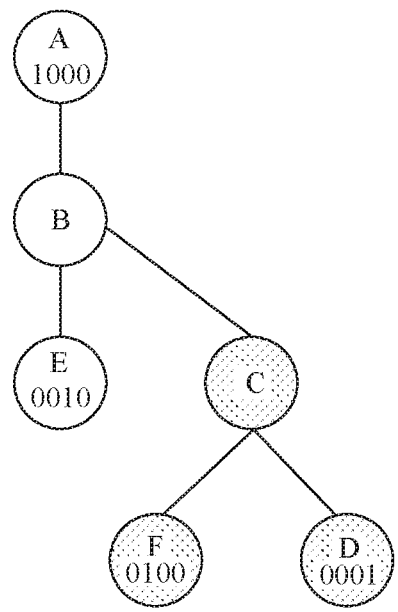
FIG. 10 is a schematic diagram of forwarding a fourth BIER packet according to an embodiment of this application.

In FIG. 10, a node C, a node F, and a node D do not support to delete data in a BIER header other than a BIER label, and another node supports to delete the data in the BIER header other than the BIER label. In this case, the node B may process a received BIER packet in the method performed by the node C in FIG. 7. A BIER header of a multicast data packet forwarded by the node C to the node F and the node D includes only the BIER label. The node E may process the received multicast data packet in a method performed by the node D in FIG. 8. The node B and the node C may determine, based on whether forwarding entries of the node B and the node C include a parameter flag=P2MP, whether to perform P2MP forwarding.

Figure 11:
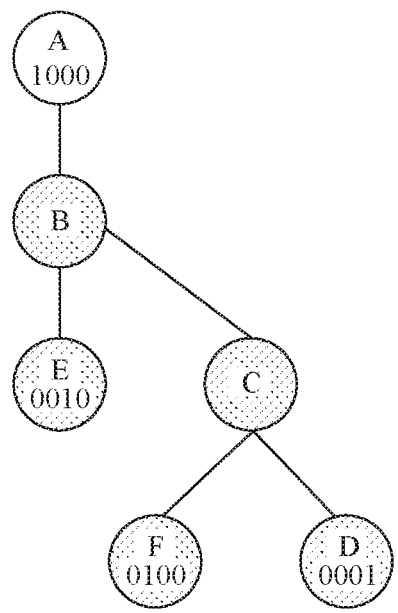
FIG. 11 is a schematic diagram of forwarding a fifth BIER packet according to an embodiment of this application.

In FIG. 11, a node B to a node F do not support to delete data in a BIER header other than a BIER label, and a node A supports to delete the data in the BIER header other than the BIER label. In this case, the node A may process a received BIER packet in the method performed by the node C in FIG. 7. The BIER packet is forwarded and processed in a P2MP manner.

After a path between the node B and the node C in the multicast tree in FIG. 7 to FIG. 11 is replaced with a path between the node E and the node C, the node E becomes a bud node. For a processing manner of the node E, refer to the processing manners of the intermediate node and the leaf node. Details are not described herein again.

In this embodiment of this application, when the downstream node of the intermediate node does not support to delete the data in the BIER header other than the BIER label, when forwarding a multicast data packet, the intermediate node may further delete the data in the BIER header of the multicast data packet other than the BIER label, so that the downstream node of the intermediate node can implement processing or forwarding on the received multicast data packet. In this way, the BIER packet can be forwarded without upgrading hardware of the node, and hardware upgrading costs are further reduced.

The solutions provided in the embodiments of this application are mainly described from a perspective of interaction between network elements. It may be understood that network elements, for example, an intermediate node and a leaf node, to implement the foregoing functions, include corresponding hardware structures and/or software modules for performing the functions. A person skilled in the all should easily be aware that, in combination with the examples described in the embodiments disclosed in this specification, units and algorithm steps can be implemented by hardware or a combination of hardware and computer software in this application. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

In the embodiments of this application, the intermediate node may be divided into function modules based on the foregoing method examples. For example, each function module may be obtained through division based on each corresponding function, or two or more functions may be integrated into one module. The integrated module may be implemented in a form of hardware, or may be implemented in a form of a software function module. It should be noted that, in the embodiments of this application, division into modules is an example, and is merely a logical function division. In actual implementation, another division manner may be used. Descriptions are provided below by using an example in which function modules are obtained through division based on corresponding functions.

Figure 12:
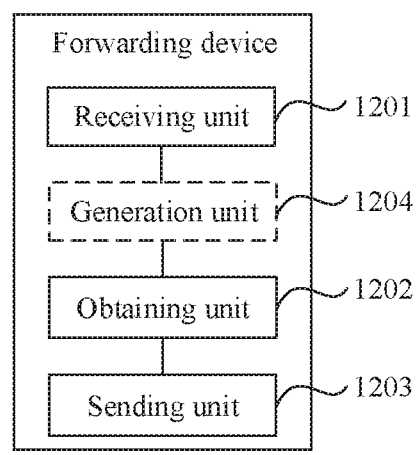
FIG. 12 is a schematic structural diagram of a first forwarding device used as an intermediate node according to an embodiment of this application.

When an integrated unit is used, FIG. 12 is a possible schematic structural diagram of the forwarding device used as an intermediate node in the foregoing embodiments. The forwarding device used as an intermediate node supports to use P2MP to forward a BIER packet, and includes a receiving unit 1201, an obtaining unit 1202, and a sending unit 1203. The receiving unit 1201 is configured to support the forwarding device used as an intermediate node in performing step 301 in FIG. 3 or step 300*b* and step 301 in FIG. 4. The obtaining unit 1202 is configured to support the forwarding device used as an intermediate node in performing step 302 and step 303 in FIG. 3 or FIG. 4. The obtaining unit 1202 and the sending unit 1203 are further configured to support the forwarding device used as an intermediate node in performing step 304 in FIG. 3 or FIG. 4. Further, the forwarding device used as an intermediate node may further include a generation unit 1204. The generation unit 1204 is configured to support the forwarding device used as an intermediate node in performing step 300*a* and step 300*c* in FIG. 4. All related content of the steps in the foregoing method embodiments may be cited in function descriptions of the corresponding function modules. Details are not described herein again.

Based on hardware implementation, the obtaining unit 1202 and the generation unit 1204 in this application may be processors of the forwarding device used as an intermediate node, the receiving unit 1201 may be a receiver of the forwarding device used as an intermediate node, the sending unit 1203 may be a transmitter of the forwarding device used as an intermediate node, and the transmitter may be usually integrated with the receiver and used as a transceiver. Specifically, the transceiver may also be referred to as a communications interface.

Figure 13:
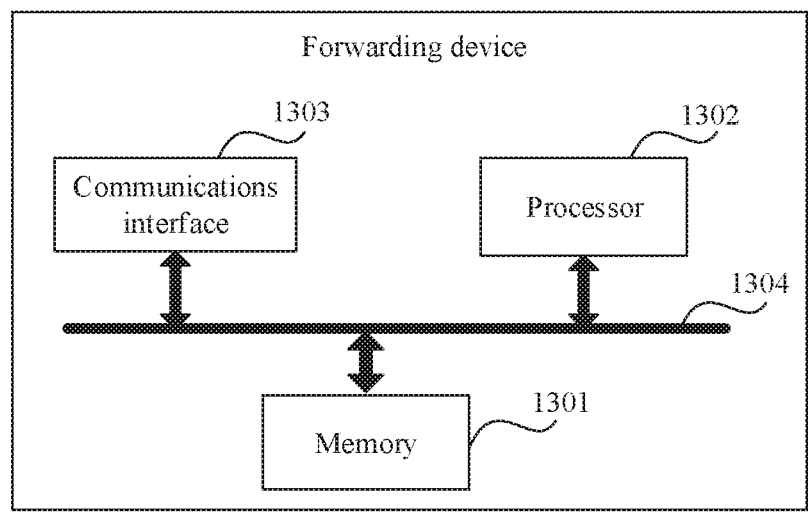
FIG. 13 is a schematic structural diagram of a second forwarding device used as an intermediate node according to an embodiment of this application.

FIG. 13 is a possible schematic diagram of a logical structure of the intermediate node in the foregoing embodiments according to an embodiment of this application. The intermediate node supports to use P2MP to forward a BIER packet, and includes a processor 1302 and a communications interface 1303. The processor 1302 is configured to control and manage an action of the forwarding device used as an intermediate node. For example, the processor 1302 is configured to support the forwarding device used as an intermediate node in performing steps of the obtaining unit 1202 and the generation unit 1204, and/or is configured to perform another process of the technology described in this specification. In addition, the forwarding device used as an intermediate node may further include a memory 1301 and a bus 1304. The processor 1302, the communications interface 1303, and the memory 1301 are connected to each other by using the bus 1304. The communications interface 1303 is configured to support the forwarding device used as an intermediate node in communication. The memory 1301 is configured to store program code and data of the forwarding device used as an intermediate node.

The processor 1302 may be a central processing unit, a general purpose processor, a digital signal processor, an application-specific integrated circuit, a field programmable gate array or another programmable logic device, a transistor logic device, a hardware component, or any combination thereof. The processor 1302 may implement or execute various example logical blocks, modules, and circuits described with reference to content disclosed in this application. Alternatively, the processor may be a combination for implementing a computing function, for example, a combination of one or more microprocessors, or a combination of a digital signal processor and a microprocessor. The bus 1304 may be a peripheral component interconnect (PCI) bus, an extended industry standard architecture (EISA) bus, or the like. The bus may be classified into an address bus, a data bus, a control bus, and the like. For ease of representation, only one thick line is used to represent the bus in FIG. 13, but this does not mean that there is only one bus or only one type of bus.

Figure 14:
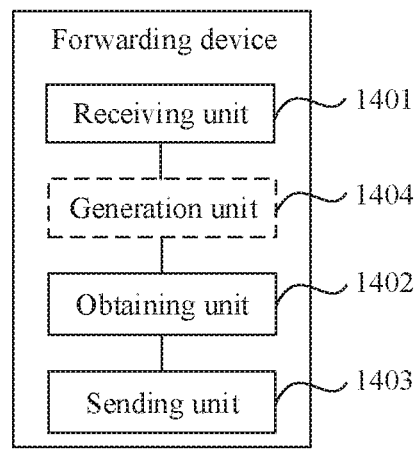
FIG. 14 is a schematic structural diagram of a third forwarding device used as an intermediate node according to an embodiment of this application.

When an integrated unit is used, FIG. 14 is a possible schematic structural diagram of the forwarding device used as an intermediate node in the foregoing embodiments. The forwarding device used as an intermediate node supports to delete data in a BIER header other than a BIER label, and includes a receiving unit 1401, an obtaining unit 1402, and a sending unit 1403. The receiving unit 1401 is configured to support the forwarding device used as an intermediate node in performing step 501 in FIG. 5 or step 500*a* and step 501 in FIG. 6. The obtaining unit 1402 is configured to support the forwarding device used as an intermediate node in performing step 502 and step 503 in FIG. 5 or FIG. 6. The obtaining unit 1402 and the sending unit 1403 are further configured to support the forwarding device used as an intermediate node in performing step 504 in FIG. 5 or FIG. 6. Further, the forwarding device used as an intermediate node further includes a generation unit 1404, configured to perform step 500*b* in FIG. 6. All related content of the steps in the foregoing method embodiments may be cited in function descriptions of the corresponding function modules. Details are not described herein again.

Based on hardware implementation, the obtaining unit 1402 and the generation unit 1404 in this application may be processors of the forwarding device used as an intermediate node, the receiving unit 1401 may be a receiver of the forwarding device used as an intermediate node, the sending unit 1403 may be a transmitter of the forwarding device used as an intermediate node, and the transmitter may be usually integrated with the receiver and used as a transceiver. Specifically, the transceiver may also be referred to as a communications interface.

Figure 15:
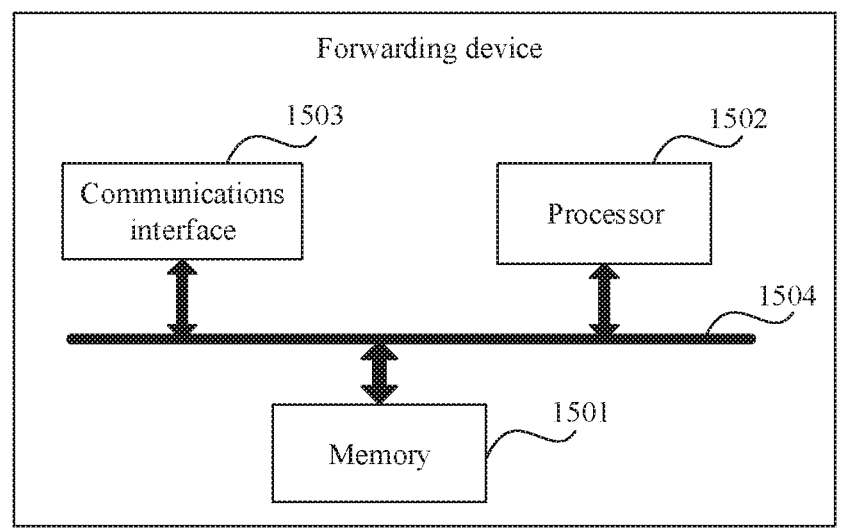
FIG. 15 is a schematic structural diagram of a fourth forwarding device used as an intermediate node according to an embodiment of this application.

FIG. 15 is a possible schematic diagram of a logical structure of the forwarding device used as an intermediate node in the foregoing embodiments according to an embodiment of this application. The forwarding device used as an intermediate node supports to delete data in a BIER header other than a BIER label, and includes a processor 1502 and a communications interface 1503. The processor 1502 is configured to control and manage an action of the forwarding device used as an intermediate node. For example, the processor 1502 is configured to perform steps of the obtaining unit 1402 and the generation unit 1404, and/or is configured to perform another process of the technology described in this specification. In addition, the forwarding device used as an intermediate node may further include a memory 1501 and a bus 1504. The processor 1502, the communications interface 1503, and the memory 1501 are connected to each other by using the bus 1504. The communications interface 1503 is configured to support the forwarding device used as an intermediate node in communication. The memory 1501 is configured to store program code and data of the forwarding device used as an intermediate node.

The processor 1502 may be a central processing unit, a general purpose processor, a digital signal processor, an application-specific integrated circuit, a field programmable gate array or another programmable logic device, a transistor logic device, a hardware component, or any combination thereof. The processor 1502 may implement or execute various example logical blocks, modules, and circuits described with reference to content disclosed in this application. Alternatively, the processor may be a combination for implementing a computing function, for example, a combination of one or more microprocessors, or a combination of a digital signal processor and a microprocessor. The bus 1504 may be a peripheral component interconnect (PCI) bus, an extended industry standard architecture (EISA) bus, or the like. The bus may be classified into an address bus, a data bus, a control bus, and the like. For ease of representation, only one thick line is used to represent the bus in FIG. 15, but this does not mean that there is only one bus or only one type of bus.

In another embodiment of this application, a readable storage medium is further provided. The readable storage medium stores a computer executable instruction. When a device (which may be a single-chip microcomputer, a chip, or the like) or a processor performs the steps in the multicast data packet processing method provided in FIG. 3 or FIG. 4, the foregoing storage medium may include any medium that can store program code, such as a USB flash drive, a removable hard disk, a read-only memory, a random access memory, a magnetic disk, or an optical disc.

In another embodiment of this application, a readable storage medium is further provided. The readable storage medium stores a computer executable instruction. When a device (which may be a single-chip microcomputer, a chip, or the like) or a processor performs the steps in the multicast data packet processing method provided in FIG. 5 or FIG. 6, the foregoing storage medium may include any medium that can store program code, such as a USB flash drive, a removable hard disk, a read-only memory, a random access memory, a magnetic disk, or an optical disc.

In another embodiment of this application, a computer program product is further provided. The computer program product includes a computer executable instruction, and the computer executable instruction is stored in a computer readable storage medium. At least one processor of a device may read the computer executable instruction from the computer readable storage medium, and when the at least one processor executes the computer executable instruction, the device implements the steps in the multicast data packet processing method provided in FIG. 3 or FIG. 4.

In another embodiment of this application, a computer program product is further provided. The computer program product includes a computer executable instruction, and the computer executable instruction is stored in a computer readable storage medium. At least one processor of a device may read the computer executable instruction from the computer readable storage medium, and when the at least one processor executes the computer executable instruction, the device implements the steps in the multicast data packet processing method provided in FIG. 5 or FIG. 6.

In the embodiments of this application, if the forwarding device used as an intermediate node cannot identify and process a bit string in a BIER header, but supports to use P2MP to forward a BIER packet, when the forwarding device used as an intermediate node receives a first multicast data packet and obtains a first forwarding entry and a second forwarding entry, the forwarding device used as an intermediate node may process the first multicast data packet based on the second forwarding entry and a second identifier that is in the first forwarding entry and that is used to instruct to perform P2MP forwarding on the packet, to obtain a second multicast data packet, and does not need to read or analyze the BIER header of the first multicast data packet during processing, so that the BIER packet can be forwarded without upgrading hardware of the node, thereby reducing hardware upgrading costs. In addition, when a downstream node of the forwarding device used as an intermediate node does not support to delete data in the BIER header other than a BIER label, when forwarding a multicast data packet, the forwarding device used as an intermediate node may further delete the data in the BIER header of the multicast data packet other than the BIER label, so that a downstream node of the intermediate node can implement processing or forwarding on the received multicast data packet. In this way, the BIER packet can be forwarded without upgrading hardware of the node, and hardware upgrading costs are further reduced.

Finally, it should be noted that the foregoing descriptions are merely specific implementations of this application, but are not intended to limit the protection scope of this application. Any variation or replacement within the technical scope disclosed in this application shall fall within the protection scope of this application. Therefore, the protection scope of this application shall be subject to the protection scope of the claims.

What is claimed is:

1. A multicast data packet processing method in a point-to-multipoint (P2MP)-based bit index explicit replication (BIER) multicast tree that includes an intermediate node configured to use P2MP to forward a BIER packet, the method comprising:
receiving, by the intermediate node, a first multicast data packet, wherein a BIER header of the first multicast data packet comprises a first label;
obtaining, by the intermediate node, a first forwarding entry based on the first label, wherein the first forwarding entry comprises the first label, a first identifier, and a second identifier, the first identifier identifying the multicast tree, and the second identifier instructing to perform P2MP forwarding on the first multicast data packet;
obtaining, by the intermediate node, a second forwarding entry based on the first identifier, wherein the second forwarding entry comprises the first identifier and a second label;
obtaining, by the intermediate node, a second multicast data packet based on the second identifier, the second forwarding entry, and the first multicast data packet, wherein the second multicast data packet comprises the second label; and
sending, by the intermediate node, the second multicast data packet.

2. The method according to claim 1, wherein
the second forwarding entry further comprises an outbound interface, the obtaining the second multicast data packet comprises
replacing, by the intermediate node and based on the
second identifier, the first label in the first multicast data
packet with the second label, to obtain the second
multicast data packet, and the sending the second multicast data packet comprises
sending, by the intermediate node, the second multicast
data packet through the outbound interface.

3. The method according to claim 1, wherein the obtaining the first forwarding entry comprises:
generating, by the intermediate node, the first forwarding entry based on first configuration information, the first label, and the first identifier, wherein the first configuration information indicates that the intermediate node is configured to use P2MP to forward the BIER packet, and the second identifier is an identifier obtained based on the first configuration information.

4. The method according to claim 1, wherein
the second forwarding entry further comprises a third identifier and an outbound interface, the third identifier instructing to delete data other than a BIER label in the BIER header,
the obtaining the second multicast data packet comprises:
replacing, by the intermediate node and based on the second identifier, the first label in the first multicast data packet with the second label, to obtain a label-replaced first multicast data packet; and
deleting, by the intermediate node and based on the third identifier, data other than the second label in a BIER header of the label-replaced first multicast data packet, to obtain the second multicast data packet, and
the sending the second multicast data packet comprises sending, by the intermediate node, the second multicast data packet through the outbound interface.

5. The method according to claim 1, further comprising, before the obtaining the second forwarding entry:
receiving, by the intermediate node, the second label and second configuration information from a downstream node in the multicast tree, wherein the second configuration information indicates that the downstream node is not configured to delete the data other than the BIER label in the BIER header,
wherein the obtaining the second forwarding entry comprises generating, by the intermediate node, the second forwarding entry based on the second label and the second configuration information, wherein the third identifier is an identifier obtained based on the second configuration information.

6. A multicast data packet processing method to in a point-to-multipoint (P2MP)-based bit index explicit replication (BIER) multicast tree that includes an intermediate node configured to delete data other than a BIER label in a BIER header, the method comprising:
receiving, by the intermediate node, a first multicast data packet, wherein a BIER header of the first multicast data packet comprises a first label;
obtaining, by the intermediate node, a first forwarding entry based on the first label, wherein the first forwarding entry comprises the first label and a first identifier, the first identifier identifying the multicast tree;
obtaining, by the intermediate node, a second forwarding entry based on the first identifier, wherein the second forwarding entry comprises the first identifier, a second identifier, and a second label, the second identifier instructing to delete the data other than the BIER label in the BIER header;

obtaining, by the intermediate node, a second multicast data packet based on the second forwarding entry and the first multicast data packet, wherein the second multicast data packet comprises the second label; and
sending, by the intermediate node, the second multicast data packet.

7. The method according to claim 6, wherein
the second forwarding entry further comprises an outbound interface,
the obtaining the second multicast data packet comprises:
deleting, by the intermediate node and based on the second identifier, data other than the first label in the BIER header of the first multicast data packet, to obtain a data-deleted first multicast data packet; and
replacing, by the intermediate node, the first label in the data-deleted first multicast data packet with the second label, to obtain the second multicast data packet, and
the sending the second multicast data packet comprises sending, by the intermediate node, the second multicast data packet through the outbound interface.

8. The method according to claim 6, further comprising, before the obtaining the second forwarding entry:
receiving, by the intermediate node, the second label and configuration information from a downstream node in the multicast tree, wherein the configuration information indicates that the downstream node is not configured to delete the data other than the BIER label in the BIER header,
wherein the obtaining the second forwarding entry comprises generating, by the intermediate node, the second forwarding entry based on the second label and the configuration information, wherein the second identifier is an identifier obtained based on the configuration information.

9. A forwarding device configured as an intermediate node in a point-to-multipoint (P2MP)-based bit index explicit replication (BIER) multicast tree, and configured to use P2MP to forward a BIER packet, the forwarding device comprising:
a processor; and
a non-transitory computer-readable storage medium coupled to the processor and storing programming instructions which are executable by the processor and instruct the processor to:
receive a first multicast data packet, wherein a BIER header of the first multicast data packet comprises a first label,
obtain a first forwarding entry based on the first label, wherein the first forwarding entry comprises the first label, a first identifier, and a second identifier, the first identifier identifying the multicast tree, and the second identifier instructing to perform P2MP forwarding on the first multicast data packet,
obtain a second forwarding entry based on the first identifier, wherein the second forwarding entry comprises the first identifier and a second label,
obtain a second multicast data packet based on the second identifier, the second forwarding entry, and the first multicast data packet, wherein the second multicast data packet comprises the second label, and
send the second multicast data packet.

10. The forwarding device according to claim 9, wherein the second forwarding entry further comprises an outbound interface, and the programming instructions further instruct the processor to:

replace, based on the second identifier, the first label in the first multicast data packet with the second label, to obtain the second multicast data packet, and send the second multicast data packet through the outbound interface.

11. The forwarding device according to claim 9, wherein the programming instructions further instruct the processor to:

generate the first forwarding entry based on first configuration information, the first label, and the first identifier, wherein the first configuration information indicates that the forwarding device is configured to use P2MP to forward the BIER packet, and the second identifier is an identifier obtained based on the first configuration information.

12. The forwarding device according to claim 9, wherein the second forwarding entry further comprises a third identifier and an outbound interface, the third identifier instructing to delete data other than a BIER label in the BIER header, and the programming instructions further instruct the processor to:

replace, based on the second identifier, the first label in the first multicast data packet with the second label, to obtain a label-replaced first multicast data packet, delete, based on the third identifier, data other than the second label in a BIER header of the label-replaced first multicast data packet, to obtain the second multicast data packet, and send the second multicast data packet through the outbound interface.

13. The forwarding device according to claim 12, wherein the programming instructions further instruct the processor to:

receive the second label and second configuration information from a downstream node in the multicast tree, wherein the second configuration information indicates that the downstream node is not configured to delete the data other than the BIER label in the BIER header, and generate the second forwarding entry based on the second label and the second configuration information, wherein the third identifier is an identifier obtained based on the second configuration information.

14. A forwarding device configured as an intermediate node in a point-to-multipoint (P2MP)-based bit index explicit replication (BIER) multicast tree, and configured to delete data other than a BIER label in a BIER header, the forwarding device comprising:

a processor; and a non-transitory computer-readable storage medium coupled to the processor and storing programming instructions which are executable by the processor and instruct the processor to:

receive a first multicast data packet, wherein a BIER header of the first multicast data packet comprises a first label, obtain a first forwarding entry based on the first label, wherein the first forwarding entry comprises the first label and a first identifier, the first identifier identifying the multicast tree, obtain a second forwarding entry based on the first identifier, wherein the second forwarding entry comprises the first identifier, a second identifier, and a second label, the second identifier instructing to delete the data other than the BIER label in the BIER header, obtain a second multicast data packet based on the second forwarding entry and the first multicast data packet, wherein the second multicast data packet comprises the second label, and send the second multicast data packet.

15. The forwarding device according to claim 14, wherein the second forwarding entry further comprises an outbound interface, and the programming instructions further instruct the processor to:

delete, based on the second identifier, data other than the first label in the BIER header of the first multicast data packet, to obtain a data-deleted first multicast data packet, replace the first label in the data-deleted first multicast data packet with the second label, to obtain the second multicast data packet, and send the second multicast data packet through the outbound interface.

16. The forwarding device according to claim 14, wherein the programming instructions further instruct the processor to:

receive the second label and configuration information from a downstream node in the multicast tree, wherein the configuration information indicates that the downstream node is not configured to delete the data other than the BIER label in the BIER header, and generate the second forwarding entry based on the second label and the configuration information, wherein the second identifier is an identifier obtained based on the configuration information.

* * * * *